(12) United States Patent
Hage et al.

(10) Patent No.: US 11,585,744 B2
(45) Date of Patent: *Feb. 21, 2023

(54) COMPENSATION EDITOR

(71) Applicant: Becton, Dickinson and Company, Franklin Lakes, NJ (US)

(72) Inventors: Maya Hage, San Jose, CA (US); Alexander Fainshtein, San Jose, CA (US)

(73) Assignee: BECTON, DICKINSON AND COMPANY, Franklin Lakes, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/470,504

(22) Filed: Sep. 9, 2021

(65) Prior Publication Data

US 2021/0404939 A1 Dec. 30, 2021

Related U.S. Application Data

(63) Continuation of application No. 16/799,504, filed on Feb. 24, 2020, now Pat. No. 11,143,587.

(60) Provisional application No. 62/828,385, filed on Apr. 2, 2019.

(51) Int. Cl.
 *G01N 15/14* (2006.01)
 *G01J 3/44* (2006.01)
 *G01N 15/10* (2006.01)

(52) U.S. Cl.
 CPC ........ *G01N 15/1425* (2013.01); *G01J 3/4406* (2013.01); *G01N 15/1434* (2013.01); *G01N 15/1459* (2013.01); *G01N 2015/1006* (2013.01); *G01N 2015/1402* (2013.01); *G01N 2015/149* (2013.01)

(58) Field of Classification Search
 CPC ............. G01J 3/4406; G01N 15/1425; G01N 15/1434; G01N 15/1459; G01N 2015/1006; G01N 2015/1402; G01N 2015/149

See application file for complete search history.

(56) References Cited

U.S. PATENT DOCUMENTS 11,143,587 B2 * 10/2021 Hage .................. G01N 15/1425
2010/0256943 A1 10/2010 Donnenberg et al.
(Continued)

FOREIGN PATENT DOCUMENTS

| WO | WO2017011549 | 1/2017 |
| WO | WO2019018129 | 1/2019 |
| WO | WO2019245709 | 5/2019 |

OTHER PUBLICATIONS

Beckman Coulter, Inc. "Kaluza Analysis Software Instruction for Use", 2016, PN A75667 AE.
(Continued)

*Primary Examiner* — Mark R Gaworecki
(74) *Attorney, Agent, or Firm* — Bret E. Field; Bozicevic, Field & Francis LLP

(57) ABSTRACT

Disclosed herein include systems, devices, methods, and spillover editor for displaying and editing spillover values. A view of a spillover editor can comprise a triangular grid of rows and columns, representing flourophores, each comprising at least one display area and two spillover values. After receiving an adjusted spillover value, an adjusted view of the spillover editor can comprise adjusted plots determined using the adjusted spillover value.

20 Claims, 12 Drawing Sheets

(56) References Cited

U.S. PATENT DOCUMENTS

2015/0140577 A1  5/2015  Li et al.
2017/0016828 A1  1/2017  Xu et al.

OTHER PUBLICATIONS

Nguyen, et al "Quantifying spillover spreading for comparing instrument performance and aiding in multicolor panel design", Cytometry A . Mar. 2013;83(3):306-15.

Janmohamed-Anastasakis, et al. "Committee Title: Compensation Tips for Beckman Coulter 10-Color Navios Platform", Jun. 18, 2018 (Jun. 18, 2018), pp. 1-13.

Chevrier, et al. "Compensation of Signal Spillover in Suspension and Imaging Mass Cytometry", Cell Systems, Cell Press, US, vol. 6, No. 5, 2018 (May 1, 2018), pp. 612-620.e5.

* cited by examiner

COMPENSATION EDITOR

INTRODUCTION

Field

This disclosure relates to relates generally to the field of automated particle assessment, and more particularly to sample analysis and particle characterization methods.

BACKGROUND

Particle analyzers, such as flow cytometers, can enable the characterization of particles on the basis of electro-optical measurements such as light scatter and fluorescence. In a flow cytometer, for example, particles, such as molecules, analyte-bound beads, or individual cells, in a fluid suspension are passed by a detection region in which the particles are exposed to an excitation light, typically from one or more lasers, and the light scattering and fluorescence properties of the particles are measured. Particles or components thereof typically are labeled with fluorescent dyes to facilitate detection. A multiplicity of different particles or components can be simultaneously detected by using spectrally distinct fluorescent dyes to label the different particles or components. Different cell types can be identified by their light scatter characteristics and fluorescence emissions resulting from labeling various cell proteins or other constituents with fluorescent dye-labeled antibodies or other fluorescent probes. The data obtained from an analysis of cells (or other particles) by multi-color flow cytometry are multidimensional, where each cell corresponds to a point in a multidimensional space defined by the parameters measured. Populations of cells or particles can be identified as clusters of points in the data space.

SUMMARY

Disclosed herein include embodiments of a method for displaying and editing spillover values. In some embodiments, the method is under control of a processor (e.g., a hardware processor or a virtual processor) and comprises: causing display a view of a spillover editor comprising a triangular grid of a plurality of rows and a plurality of columns each comprising at least one display area of a first plurality of display areas with a background color of the display area. Each of the plurality of rows and the plurality of columns can represent a fluorophore of a first plurality of fluorophores. Each of the plurality of rows and the plurality of columns can be associated with a header information object of the fluorophore represented by the row and column, respectively. Each of the first plurality of display areas can be in a row of the plurality of rows and a column of the plurality of columns. Each of the first plurality of display areas can represent the two fluorophores of the first plurality of fluorophores represented by the row and the column the display area is in. Each of the first plurality of display areas can comprise (i) a first plot of a plurality of first plots related to the two fluorophores represented by the first plot and (ii) two spillover value information objects, each comprising a spillover value associated with the fluorophores represented by the display area, at a first spillover value information object location and a second spillover value information object location. The numbers of the one or more display areas of two adjacent rows of the plurality of rows and two adjacent columns of the plurality of columns can differ by at least one. The method can comprise: receiving a selection event of a selected display area of the first plurality of display areas in a selected row of the plurality of rows and a selected column of the plurality of columns. The method can comprise: causing display a selected view of the spillover editor comprising the selected display area comprising (i) the first plot of the selected display area and (ii) label information objects of the fluorophores represented by the selected display area at a first label information object location and a second label information object location of the selected display area. The method can comprise: receiving an adjusted spillover value of a first spillover value information object of the two spillover value information objects of the selected display area. The method can comprise: causing display a first adjusted view of the spillover editor comprising the first plurality of display areas each comprising (i) a second plot related to the corresponding first plot generated based on the adjusted spillover value and (ii) the two spillover information objects of the display area at the first spillover value information object location and the second spillover value information object location. The selected display area can have an adjusted background color of the display area and comprise (i) the adjusted spillover value of the first spillover value information object at the first spillover value information object location and (ii) the spillover value of the first spillover value information object at the first label information object location.

Disclosed herein include embodiments of a method for displaying and editing spillover values. In some embodiments, the method is under control of a processor (e.g., a hardware processor or a virtual processor) and comprises: causing display a view of a spillover editor comprising a triangular grid of a plurality of rows and a plurality of columns each comprising at least one display area of a first plurality of display areas with a background color of the display area. Each of the plurality of rows and the plurality of columns can represent a fluorophore of a first plurality of fluorophores. Each of the plurality of rows and the plurality of columns can be associated with a header information object of the fluorophore represented by the row and column, respectively. Each of the first plurality of display areas can be in a row of the plurality of rows and a column of the plurality of columns. Each of the first plurality of display areas can represent the two fluorophores of the first plurality of fluorophores represented by the row and the column the display area is in, wherein each of the first plurality of display areas comprises (i) a first plot of a plurality of first plots and (ii) two spillover value information objects, comprising two spillover values associated with the fluorophores represented by the display area, at a first spillover value information object location and a second spillover value information object location. The method can comprise receiving an adjusted spillover value of a first spillover value information object of the two spillover value information objects of a selected display area of the first plurality of display areas in a selected row of the plurality of rows and a selected column of the plurality of columns. The method can comprise causing display a first adjusted view the spillover editor comprising the first plurality of display areas each comprising (i) a second plot related to the corresponding first plot generated based on the adjusted spillover value and (ii) the two spillover information objects of the display area at the first spillover value information object location and the second spillover value information object location. The selected display area cab have an adjusted background color of the display area and comprises (i) the adjusted spillover value of the first spillover value information object at the first spillover value information object location and (ii) the spillover value of the first spillover value information object at the first label information object location. The numbers of the one or more display areas of two adjacent rows of the plurality of rows and two adjacent columns of the plurality of columns can differ by at least one. The method can comprise receiving a selection event of the selected display area of the first plurality of display areas in the selected row of the plurality of rows and the selected column of the plurality of columns. The method can comprise causing display a selected view of the spillover editor comprising the selected display area comprising (i) the first plot of the selected display area and (ii) label information objects of the fluorophores represented by the selected display area at a first label information object location and a second label information object location of the selected display area.

In some embodiments, each of the first plurality of display areas in the first adjusted view of the spillover editor comprises the first plot and the second plot of the display area superimposed. In some embodiments, the method comprises determining a selection event to superimpose the first plot and the second plot.

In some embodiments, the method comprises: obtaining a spillover matrix (or a spillover table) comprising the spillover values; and generating the view of the spillover editor using the spillover matrix and/or an inverse matrix of the spillover matrix. The spillover matrix can be a default unadjusted spillover matrix. The spillover matrix can be a first adjusted spillover matrix. The method can comprise: determining a second adjusted spillover matrix comprising the adjusted spillover value from the spillover matrix; and generating the first adjusted view of the spillover editor using the second adjusted spillover matrix. The method can comprise determining an inverse matrix of the second adjusted spillover matrix, wherein generating the first adjusted view of the spillover editor comprises generating the first adjusted view of the spillover editor using the inverse matrix of the second adjusted spillover matrix. The method can include receiving the spillover matrix.

In some embodiments, the first plot and/or the second plot comprises a bivariate plot related to the fluorophores represented by the first plot. The bivariate plot can comprise a distribution of multi-dimensional event data related to the fluorophores represented by the bivariate plot and associated with a plurality of cells. The bivariate plot can comprise a distribution of multi-dimensional event data related to the fluorophores represented by the bivariate plot and associated with one or more cells of interest of a plurality of cells. In some embodiments, the first plot and/or the second plot comprises a bivariate plot related to the fluorophores represented by the first plot. The bivariate plot can comprise a distribution of multi-dimensional event data related to the fluorophores represented by the bivariate plot and associated with a plurality of cell. The bivariate plot can comprise a distribution of multi-dimensional event data related to the fluorophores represented by the bivariate plot and associated with one or more cells of interest of a plurality of cells.

In some embodiments, the method comprises: causing display a population hierarchy of a plurality of cell types of the plurality of cells determined using the multi-dimensional event data; and receiving a selection event of one or more of the plurality of cells types, wherein the one or more cells of interest comprise one or more cells of the plurality of cells having any of the one or more of the plurality of cell types. The method can comprise: receiving multi-dimensional event data related to the first plurality of fluorophores and associated with a plurality of cells.

In some embodiments, the two fluorophores represented by each display area of the plurality of display areas are different. The fluorophore represented by a column of the plurality of columns can have an emission spectrum with a wavelength having the highest emission that is greater than a wavelength having the highest emission of an emission spectrum of a fluorophore represented by a subsequent column of the plurality of columns.

In some embodiments, the method comprises receiving a selection of the first plurality of fluorophores from a second plurality of fluorophores comprising the first plurality of fluorophores. The method can comprise receiving a selection of a second plurality of fluorophores from the first plurality of fluorophores comprising the second plurality of fluorophores. Each of the plurality of rows and the plurality of columns can represent a fluorophores of the second plurality of fluorophores, and each of the first plurality of display areas can represent the two fluorophores of the second plurality of fluorophores represented by the row and the column the display area is in. The method can comprise causing display a second adjusted view of the spillover editor comprising a second plurality of display areas each comprising (i) the second plot related to the corresponding first plot, generated based on the adjusted spillover value, that represents two fluorophores of the second plurality of fluorophores and (ii) the two spillover information objects of the display area at the first spillover value information object location and the second spillover value information object location. The method can comprise generating the second adjusted view of the spillover editor.

In some embodiments, the numbers of the one or more display areas of any two adjacent rows of the plurality of rows and two adjacent columns of the plurality of columns differ by at least one. The numbers of the one or more display areas of any two adjacent rows of the plurality of rows and two adjacent columns of the plurality of columns can differ by one.

In some embodiments, the rightmost display area of the at least one display area of each of the plurality of rows align with one another. The topmost display area of the at least one display area of each of the plurality of columns can align with one another.

In some embodiments, the header information object of each row is to the left of the leftmost display area of the at least one display area of the row. The header information object of each column can be on the top of the topmost display area of the at least one display area of the column.

In some embodiments, the header information object and/or at least one of the label information objects of the fluorophore each comprises a text label of the fluorophore. The header information object and/or at least one of the label information objects of the fluorophore can have a background color related to an emission spectrum of the fluorophore. The background color of the header information object and/or at least one of the label information objects of the fluorophore can be the color of the wavelength with the highest emission in the emission spectrum of the fluorophore. The background color of the header information object and/or at least one of the label information objects can be approximately the color of the wavelength with the highest emission in the emission spectrum of the fluorophore. The emission spectra of two fluorophores of the plurality of fluorophores can be different and/or the wavelengths with the highest emissions in the emission spectra of the two fluorophores can be different. The header information objects and/or the label information objects of the two fluorophores can have an identical background color. A color of the text label of the fluorophore of the background information object and/or at least one of the label information objects and the background color of the background information object and/or the at least one of the label information objects can have a high contrast. The color of the text label can be a white color.

In some embodiments, a color of a spillover value of at least one of the spillover value information objects of a display area can be associated with the emission spectrum of one of the fluorophores represented by the display area. The color of the spillover value of at least one of the spillover value information objects can be the color of the wavelength with the highest emission in the emission spectrum of the one of the fluorophores represented by the display area. The color of the spillover value of at least one of the spillover value information objects can be approximately the color of the wavelength with the highest emission in the emission spectrum of the one of the fluorophores represented by the display area. A background color of the at least one of the spillover value information objects and the color of the spillover value of at least one of the spillover value information object can have a high contrast. A background color of the at least one of the spillover value information objects can be a white color.

In some embodiments, the first spillover value information object location is adjacent to the first label information object location, and wherein the second spillover value information object location is adjacent to the second label information object location. The first spillover value information object location can be horizontally adjacent to the first label information object location, and the second spillover value information object location can be horizontally adjacent to the second label information object location. The first spillover value information object location can be to the left to the first label information object location, and/or wherein the second spillover value information object location can be to the right of the second label information object location. The first spillover value information object location can be to the right to the first label information object location, and/or wherein the second spillover value information object location can be to the left of the second label information object location. The first spillover value information object location can be adjacent to the second label information object location, and the second spillover value information object location can be adjacent to the first label information object location.

In some embodiments, the first spillover value information object location and the second spillover value information object location are at opposite corners of the first plot and/or the second plot. The first spillover value information object location and the second spillover value information object location can be at a top right corner and a bottom left corner of the first display area. The spillover value of the first spillover value information object in the first display area can be a spillover value associated with the emission of a first fluorophore of the two fluorophores represented by the first display area into the detected emission of a second fluorophore of the two fluorophores, and the spillover value of the second spillover value information object in the first display area can be a spillover value associated with the emission of the second fluorophore of the two fluorophores represented by the first display area into the detected emission of the first fluorophore of the two fluorophores. The first fluorophore can be represented by the column where the display area is, and the second fluorophore can be represented by the row where the display area is.

In some embodiments, the background color is white, and the adjusted background color is a non-white color. The non-white color of the adjusted background color can be related to the difference between the adjusted spillover value and the corresponding spillover value. The non-white color of the adjusted background color can be related to the difference between the adjusted spillover value and a corresponding default spillover value.

In some embodiments, the spillover value information objects of each of the first plurality of display areas and/or the selected display area each comprises an increase indicator and a decrease indicator. The increase indicator can comprise an up arrow, and wherein the decrease indicator comprises a down arrow. Receiving the adjusted spillover value can comprise receiving an activation event of the increase indicator or the decrease activator. Receiving the adjusted spillover value can comprise receiving a text input of the adjusted spillover value from a user.

In some embodiments, the method can comprise: receiving a spillover value reset event of the adjusted spillover value; and causing display the view of the spillover editor. The spillover value reset event can comprise a click or a double click of the spillover value of the first spillover value information object at the first label information object location using a pointer device.

In some embodiments, the method comprises: receiving an enlarging event of a display area of the first plurality of display areas; and causing display the spillover editor comprising an enlarged display area corresponding to the display area of the enlarging event. The enlarging event of the display area can comprise a pointer device hovering over the display area of the enlarging event.

In some embodiments, the method can comprise: determining the updated spillover value is above a threshold value; and displaying a warning information object at a warning information object location adjacent to the first spillover value information object location. The threshold value can be 100%.

In some embodiments, the method can comprise generating the view of the spill editor, the selected view of the spillover editor, and/or the first adjusted view of the spillover editor. In some embodiments, the method can comprise displaying the view of the spill editor, the selected view of the spillover editor, and/or the first adjusted view of the spillover editor.

Disclosed herein include embodiments of computing system for displaying and editing spillover values. In some embodiments, the computing system can comprise: non-transitory memory configured to store executable instructions; a display; and a processor (e.g., a hardware processor or a virtual processor) in communication with the non-transitory memory and the display, the processor programmed by the executable instructions to: cause the display to render a view of a spillover editor comprising a triangular grid of a plurality of rows and a plurality of columns each comprising at least one display area of a first plurality of display areas with a background color of the display area. Each of the plurality of rows and the plurality of columns can represent a fluorophore of a first plurality of fluorophores. Each of the plurality of rows and the plurality of columns can be associated with a header information object of the fluorophore represented by the row and column, respectively. Each of the first plurality of display areas can be in a row of the plurality of rows and a column of the plurality of columns. Each of the first plurality of display areas can represent the two fluorophores of the first plurality of fluorophores represented by the row and the column the display area is in. Each of the first plurality of display areas can comprise (i) a first plot of a plurality of first plots related to the two fluorophores represented by the first plot and (ii) two spillover value information objects, each comprising a spillover value associated with the fluorophores represented by the display area, at a first spillover value information object location and a second spillover value information object location. The numbers of the one or more display areas of two adjacent rows of the plurality of rows and two adjacent columns of the plurality of columns can differ by at least one. The processor can be programmed by the executable instructions to: receive a selection event of a selected display area of the first plurality of display areas in a selected row of the plurality of rows and a selected column of the plurality of columns. The processor can be programmed by the executable instructions to: cause the display to render a selected view of the spillover editor comprising the selected display area comprising (i) the first plot of the selected display area and (ii) label information objects of the fluorophores represented by the selected display area at a first label information object location and a second label information object location of the selected display area. The processor can be programmed by the executable instructions to: receive an adjusted spillover value of a first spillover value information object of the two spillover value information objects of the selected display area. The processor can be programmed by the executable instructions to: cause the display to render a first adjusted view of the spillover editor comprising the first plurality of display areas each comprising (i) a second plot related to the corresponding first plot generated based on the adjusted spillover value and (ii) the two spillover information objects of the display area at the first spillover value information object location and the second spillover value information object location. The selected display area has an adjusted background color of the display area and can comprise (i) the adjusted spillover value of the first spillover value information object at the first spillover value information object location and (ii) the spillover value of the first spillover value information object at the first label information object location.

Disclosed herein include embodiments of computing system for displaying and editing spillover values. In some embodiments, the computing system can comprise: non-transitory memory configured to store executable instructions; a display; and a processor (e.g., a hardware processor or a virtual processor) in communication with the non-transitory memory and the display, the processor programmed by the executable instructions to: cause the display to render a view of a spillover editor comprising a triangular grid of a plurality of rows and a plurality of columns each comprising at least one display area of a first plurality of display areas with a background color of the display area. Each of the plurality of rows and the plurality of columns can represent a fluorophore of a first plurality of fluorophores. Each of the plurality of rows and the plurality of columns can be associated with a header information object of the fluorophore represented by the row and column, respectively. Each of the first plurality of display areas can be in a row of the plurality of rows and a column of the plurality of columns. Each of the first plurality of display areas can represent the two fluorophores of the first plurality of fluorophores represented by the row and the column the display area is in. Each of the first plurality of display areas can comprise (i) a first plot of a plurality of first plots and (ii) two spillover value information objects, comprising two spillover values associated with the fluorophores represented by the display area, at a first spillover value information object location and a second spillover value information object location. The processor can be programmed by the executable instructions to: receive an adjusted spillover value of a first spillover value information object of the two spillover value information objects of a selected display area of the first plurality of display areas in a selected row of the plurality of rows and a selected column of the plurality of columns. The processor can be programmed by the executable instructions to: cause the display to render a first adjusted view the spillover editor comprising the first plurality of display areas each comprising (i) a second plot related to the corresponding first plot generated based on the adjusted spillover value and (ii) the two spillover information objects of the display area at the first spillover value information object location and the second spillover value information object location. The selected display area can have an adjusted background color of the display area and comprises (i) the adjusted spillover value of the first spillover value information object at the first spillover value information object location and (ii) the spillover value of the first spillover value information object at the first label information object location. The numbers of the one or more display areas of two adjacent rows of the plurality of rows and two adjacent columns of the plurality of columns can differ by at least one. The hardware processor can be programmed by the executable instructions to: receive a selection event of the selected display area of the first plurality of display areas in the selected row of the plurality of rows and the selected column of the plurality of columns; and cause the display to render a selected view of the spillover editor comprising the selected display area comprising (i) the first plot of the selected display area and (ii) label information objects of the fluorophores represented by the selected display area at a first label information object location and a second label information object location of the selected display area.

In some embodiments, each of the first plurality of display areas in the first adjusted view of the spillover editor comprises the first plot and the second plot of the display area superimposed. In some embodiments, the hardware processor is programmed by the executable instructions to determine a selection event to superimpose the first plot and the second plot.

In some embodiments, the hardware processor is programmed by the executable instructions to: obtain a spillover matrix (or a spillover table) comprising the spillover values; and generate the view of the spillover editor using the spillover matrix and/or an inverse matrix of the spillover matrix. The spillover matrix can be a default unadjusted spillover matrix. The spillover matrix can be a first adjusted spillover matrix. The hardware processor can be programmed by the executable instructions to: determine a second adjusted spillover matrix comprising the adjusted spillover value from the spillover matrix; and generate the first adjusted view of the spillover editor using the second adjusted spillover matrix. The hardware processor can be programmed by the executable instructions to: determine an inverse matrix of the second adjusted spillover matrix, wherein generating the first adjusted view of the spillover editor comprises generating the first adjusted view of the spillover editor using the inverse matrix of the second adjusted spillover matrix.

In some embodiments, the first plot and/or the second plot comprises a bivariate plot related to the fluorophores represented by the first plot. The bivariate plot can comprise a distribution of multi-dimensional event data related to the fluorophores represented by the bivariate plot and associated with a plurality of cells. The bivariate plot can comprise a distribution of multi-dimensional event data related to the fluorophores represented by the bivariate plot and associated with one or more cells of interest of a plurality of cells. In some embodiments, the first plot and/or the second plot can comprise a bivariate plot related to the fluorophores represented by the first plot. The bivariate plot can comprise a distribution of multi-dimensional event data related to the fluorophores represented by the bivariate plot and associated with a plurality of cells. The bivariate plot can comprise a distribution of multi-dimensional event data related to the fluorophores represented by the bivariate plot and associated with one or more cells of interest of a plurality of cells.

In some embodiments, the hardware processor can be programmed by the executable instructions to: cause the display to render a population hierarchy of a plurality of cell types of the plurality of cells determined using the multi-dimensional event data; and receive a selection event of one or more of the plurality of cells types, wherein the one or more cells of interest comprise one or more cells of the plurality of cells having any of the one or more of the plurality of cell types. The hardware processor can be programmed by the executable instructions to receive multi-dimensional event data related to the first plurality of fluorophores and associated with a plurality of cells.

In some embodiments, the two fluorophores represented by each display area of the plurality of display areas can be different. The fluorophore represented by a column of the plurality of columns can have an emission spectrum with a wavelength having the highest emission that is greater than a wavelength having the highest emission of an emission spectrum of a fluorophore represented by a subsequent column of the plurality of columns.

In some embodiments, the hardware processor is programmed by the executable instructions to receive a selection of the first plurality of fluorophores from a second plurality of fluorophores comprising the first plurality of fluorophores. The hardware processor can be programmed by the executable instructions to receive a selection of a second plurality of fluorophores from the first plurality of fluorophores comprising the second plurality of fluorophores. Each of the plurality of rows and the plurality of columns can represent a fluorophores of the second plurality of fluorophores, and each of the first plurality of display areas can represent the two fluorophores of the second plurality of fluorophores represented by the row and the column the display area is in. The hardware processor can be programmed by the executable instructions to cause the display to render a second adjusted view of the spillover editor comprising a second plurality of display areas each comprising (i) the second plot related to the corresponding first plot, generated based on the adjusted spillover value, that represents two fluorophores of the second plurality of fluorophores and (ii) the two spillover information objects of the display area at the first spillover value information object location and the second spillover value information object location. The hardware processor can be programmed by the executable instructions to generate the second adjusted view of the spillover editor.

In some embodiments, the numbers of the one or more display areas of any two adjacent rows of the plurality of rows and two adjacent columns of the plurality of columns differ by at least one. The numbers of the one or more display areas of any two adjacent rows of the plurality of rows and two adjacent columns of the plurality of columns can differ by one.

In some embodiments, the header information object of each row is to the left of the leftmost display area of the at least one display area of the row. The header information object of each column can be on the top of the topmost display area of the at least one display area of the column.

In some embodiments, the rightmost display area of the at least one display area of each of the plurality of rows align with one another. The topmost display area of the at least one display area of each of the plurality of columns can align with one another.

In some embodiments, the header information object and/or at least one of the label information objects of the fluorophore each comprises a text label of the fluorophore. The header information object and/or at least one of the label information objects of the fluorophore can have a background color related to an emission spectrum of the fluorophore. The background color of the header information object and/or at least one of the label information objects of the fluorophore can be the color of the wavelength with the highest emission in the emission spectrum of the fluorophore. The background color of the header information object and/or at least one of the label information objects can be approximately the color of the wavelength with the highest emission in the emission spectrum of the fluorophore. The emission spectra of two fluorophores of the plurality of fluorophores can be different and/or the wavelengths with the highest emissions in the emission spectra of the two fluorophores are different, and the header information objects and/or the label information objects of the two fluorophores can have an identical background color. A color of the text label of the fluorophore of the background information object and/or at least one of the label information objects and the background color of the background information object and/or the at least one of the label information objects can have a high contrast. The color of the text label can be a white color.

In some embodiments, a color of a spillover value of at least one of the spillover value information objects of a display area is associated with the emission spectrum of one of the fluorophores represented by the display area. The color of the spillover value of at least one of the spillover value information objects can be the color of the wavelength with the highest emission in the emission spectrum of the one of the fluorophores represented by the display area. The color of the spillover value of at least one of the spillover value information objects can be approximately the color of the wavelength with the highest emission in the emission spectrum of the one of the fluorophores represented by the display area. A background color of the at least one of the spillover value information objects and the color of the spillover value of at least one of the spillover value information object can have a high contrast. A background color of the at least one of the spillover value information objects can be a white color.

In some embodiments, the first spillover value information object location is adjacent to the first label information object location, and wherein the second spillover value information object location is adjacent to the second label information object location. The first spillover value information object location can be horizontally adjacent to the first label information object location, and wherein the second spillover value information object location can be horizontally adjacent to the second label information object location. The first spillover value information object location can be to the left to the first label information object location, and/or wherein the second spillover value information object location can be to the right of the second label information object location. The first spillover value information object location can be to the right to the first label information object location, and/or wherein the second spillover value information object location is to the left of the second label information object location. The first spillover value information object location can be adjacent to the second label information object location, and wherein the second spillover value information object location is adjacent to the first label information object location.

In some embodiments, the first spillover value information object location and the second spillover value information object location can be at opposite corners of the first plot and/or the second plot. The first spillover value information object location and the second spillover value information object location can be at a top right corner and a bottom left corner of the first display area. The spillover value of the first spillover value information object in the first display area can be a spillover value associated with the emission of a first fluorophore of the two fluorophores represented by the first display area into the detected emission of a second fluorophore of the two fluorophores. The spillover value of the second spillover value information object in the first display area can be a spillover value associated with the emission of the second fluorophore of the two fluorophores represented by the first display area into the detected emission of the first fluorophore of the two fluorophores. The first fluorophore can be represented by the column where the display area is, and the second fluorophore can be represented by the row where the display area is.

In some embodiments, the spillover value information objects of each of the first plurality of display areas and/or the selected display area each comprises an increase indicator and a decrease indicator. The increase indicator can comprise an up arrow, and wherein the decrease indicator comprises a down arrow. To receive the adjusted spillover value, the hardware processor can be programmed by the executable instructions to receive an activation event of the increase indicator or the decrease activator. To receive the adjusted spillover value, the hardware processor can be programmed by the executable instructions to receive a text input of the adjusted spillover value from a user.

In some embodiments, the hardware processor is programmed by the executable instructions to: receive a spillover value reset event of the adjusted spillover value; and cause the display to render the view of the spillover editor. The spillover value reset event can comprise a click or a double click of the spillover value of the first spillover value information object at the first label information object location using a pointer device.

In some embodiments, the hardware processor is programmed by the executable instructions to: receive an enlarging event of a display area of the first plurality of display areas; and cause the display to render the spillover editor comprising an enlarged display area corresponding to the display area of the enlarging event. The enlarging event of the display area can comprise a pointer device hovering over the display area of the enlarging event.

In some embodiments, the hardware processor is programmed by the executable instructions to: determine the updated spillover value is above a threshold value: and display a warning information object at a warning information object location adjacent to the first spillover value information object location. The threshold value can be 100%.

In some embodiments, the hardware processor is programmed by the executable instructions to generate the view of the spill editor, the selected view of the spillover editor, and/or the first adjusted view of the spillover editor. In some embodiments, the hardware processor is programmed by the executable instructions to display the view of the spill editor, the selected view of the spillover editor, and/or the first adjusted view of the spillover editor.

Disclosed herein include embodiments of a spillover editor. In some embodiments, a view of a spillover editor comprises a triangular grid of a plurality of rows and a plurality of columns each comprising at least one display area of a first plurality of display areas with a background color of the display area. Each of the plurality of rows and the plurality of columns can represent a fluorophore of a first plurality of fluorophores. Each of the plurality of rows and the plurality of columns can be associated with a header information object of the fluorophore represented by the row and column, respectively. Each of the first plurality of display areas can be in a row of the plurality of rows and a column of the plurality of columns. Each of the first plurality of display areas can represent the two fluorophores of the first plurality of fluorophores represented by the row and the column the display area is in. Each of the first plurality of display areas can comprise (i) a first plot of a plurality of first plots related to the two fluorophores represented by the first plot and (ii) two spillover value information objects, each comprising a spillover value associated with the fluorophores represented by the display area, at a first spillover value information object location and a second spillover value information object location. The numbers of the one or more display areas of two adjacent rows of the plurality of rows and two adjacent columns of the plurality of columns can differ by at least one. In some embodiments, a selected view of the spillover editor can comprise a selected display area comprising (i) the first plot of the selected display area and (ii) label information objects of the fluorophores represented by the selected display area at a first label information object location and a second label information object location of the selected display area. In some embodiments, a first adjusted view of the spillover editor comprises the first plurality of display areas each comprising (i) a second plot related to the corresponding first plot generated based on an adjusted spillover value and (ii) the two spillover information objects of the display area at the first spillover value information object location and the second spillover value information object location. The selected display area can have an adjusted background color of the display area and comprise (i) the adjusted spillover value of the first spillover value information object at the first spillover value information object location and (ii) the spillover value of the first spillover value information object at the first label information object location.

In some embodiments, each of the first plurality of display areas in the first adjusted view of the spillover editor comprises the first plot and the second plot of the display area superimposed. In some embodiments, the method comprises determining a selection event to superimpose the first plot and the second plot.

The view of the spillover editor can be generated using the spillover matrix and/or an inverse matrix of the spillover matrix. The spillover matrix can be a default unadjusted spillover matrix. The spillover matrix can be a first adjusted spillover matrix.

In some embodiments, the first plot and/or the second plot comprises a bivariate plot related to the fluorophores represented by the first plot. The bivariate plot can comprise a distribution of multi-dimensional event data related to the fluorophores represented by the bivariate plot and associated with a plurality of cells. The bivariate plot can comprise a distribution of multi-dimensional event data related to the fluorophores represented by the bivariate plot and associated with one or more cells of interest of a plurality of cells.

In some embodiments, the first plot and/or the second plot comprises a bivariate plot related to the fluorophores represented by the first plot. The bivariate plot can comprise a distribution of multi-dimensional event data related to the fluorophores represented by the bivariate plot and associated with a plurality of cell. The bivariate plot can comprise a distribution of multi-dimensional event data related to the fluorophores represented by the bivariate plot and associated with one or more cells of interest of a plurality of cells.

In some embodiments, the two fluorophores represented by each display area of the plurality of display areas are different. The fluorophore represented by a column of the plurality of columns can have an emission spectrum with a wavelength having the highest emission that is greater than a wavelength having the highest emission of an emission spectrum of a fluorophore represented by a subsequent column of the plurality of columns.

In some embodiments, a selection of the first plurality of fluorophores from a second plurality of fluorophores can comprise the first plurality of fluorophores. Each of the plurality of rows and the plurality of columns can represent a fluorophores of the second plurality of fluorophores, and each of the first plurality of display areas can represent the two fluorophores of the second plurality of fluorophores represented by the row and the column the display area is in. A second adjusted view of the spillover editor can comprise a second plurality of display areas each comprising (i) the second plot related to the corresponding first plot, generated based on the adjusted spillover value, that represents two fluorophores of the second plurality of fluorophores and (ii) the two spillover information objects of the display area at the first spillover value information object location and the second spillover value information object location.

In some embodiments, the numbers of the one or more display areas of any two adjacent rows of the plurality of rows and two adjacent columns of the plurality of columns differ by at least one. The numbers of the one or more display areas of any two adjacent rows of the plurality of rows and two adjacent columns of the plurality of columns can differ by one.

In some embodiments, the rightmost display area of the at least one display area of each of the plurality of rows align with one another. The topmost display area of the at least one display area of each of the plurality of columns can align with one another.

In some embodiments, the header information object of each row is to the left of the leftmost display area of the at least one display area of the row. The header information object of each column can be on the top of the topmost display area of the at least one display area of the column.

In some embodiments, the header information object and/or at least one of the label information objects of the fluorophore each comprises a text label of the fluorophore. The header information object and/or at least one of the label information objects of the fluorophore can have a background color related to an emission spectrum of the fluorophore. The background color of the header information object and/or at least one of the label information objects of the fluorophore can be the color of the wavelength with the highest emission in the emission spectrum of the fluorophore. The background color of the header information object and/or at least one of the label information objects can be approximately the color of the wavelength with the highest emission in the emission spectrum of the fluorophore. The emission spectra of two fluorophores of the plurality of fluorophores can be different and/or the wavelengths with the highest emissions in the emission spectra of the two fluorophores can be different. The header information objects and/or the label information objects of the two fluorophores can have an identical background color. A color of the text label of the fluorophore of the background information object and/or at least one of the label information objects and the background color of the background information object and/or the at least one of the label information objects can have a high contrast. The color of the text label can be a white color.

In some embodiments, a color of a spillover value of at least one of the spillover value information objects of a display area can be associated with the emission spectrum of one of the fluorophores represented by the display area. The color of the spillover value of at least one of the spillover value information objects can be the color of the wavelength with the highest emission in the emission spectrum of the one of the fluorophores represented by the display area. The color of the spillover value of at least one of the spillover value information objects can be approximately the color of the wavelength with the highest emission in the emission spectrum of the one of the fluorophores represented by the display area. A background color of the at least one of the spillover value information objects and the color of the spillover value of at least one of the spillover value information object can have a high contrast. A background color of the at least one of the spillover value information objects can be a white color.

In some embodiments, the first spillover value information object location is adjacent to the first label information object location, and wherein the second spillover value information object location is adjacent to the second label information object location. The first spillover value information object location can be horizontally adjacent to the first label information object location, and the second spillover value information object location can be horizontally adjacent to the second label information object location. The first spillover value information object location can be to the left to the first label information object location, and/or wherein the second spillover value information object location can be to the right of the second label information object location. The first spillover value information object location can be to the right to the first label information object location, and/or wherein the second spillover value information object location can be to the left of the second label information object location. The first spillover value information object location can be adjacent to the second label information object location, and the second spillover value information object location can be adjacent to the first label information object location.

In some embodiments, the first spillover value information object location and the second spillover value information object location are at opposite corners of the first plot and/or the second plot. The first spillover value information object location and the second spillover value information object location can be at a top right corner and a bottom left corner of the first display area. The spillover value of the first spillover value information object in the first display area can be a spillover value associated with the emission of a first fluorophore of the two fluorophores represented by the first display area into the detected emission of a second fluorophore of the two fluorophores, and the spillover value of the second spillover value information object in the first display area can be a spillover value associated with the emission of the second fluorophore of the two fluorophores represented by the first display area into the detected emission of the first fluorophore of the two fluorophores. The first fluorophore can be represented by the column where the display area is, and the second fluorophore can be represented by the row where the display area is.

In some embodiments, the background color is white, and the adjusted background color is a non-white color. The non-white color of the adjusted background color can be related to the difference between the adjusted spillover value and the corresponding spillover value. The non-white color of the adjusted background color can be related to the difference between the adjusted spillover value and a corresponding default spillover value.

In some embodiments, the spillover value information objects of each of the first plurality of display areas and/or the selected display area each comprises an increase indicator and a decrease indicator. The increase indicator can comprise an up arrow, and wherein the decrease indicator comprises a down arrow.

In some embodiments, a view of the spillover editor can comprise an enlarged display area corresponding to the display area of the enlarging event. The enlarging event of the display area can comprise a pointer device hovering over the display area of the enlarging event. A view of the spillover editor can comprise a warning information object at a warning information object location adjacent to the first spillover value information object location. The threshold value can be 100%.

DETAILED DESCRIPTION

Figure 1:
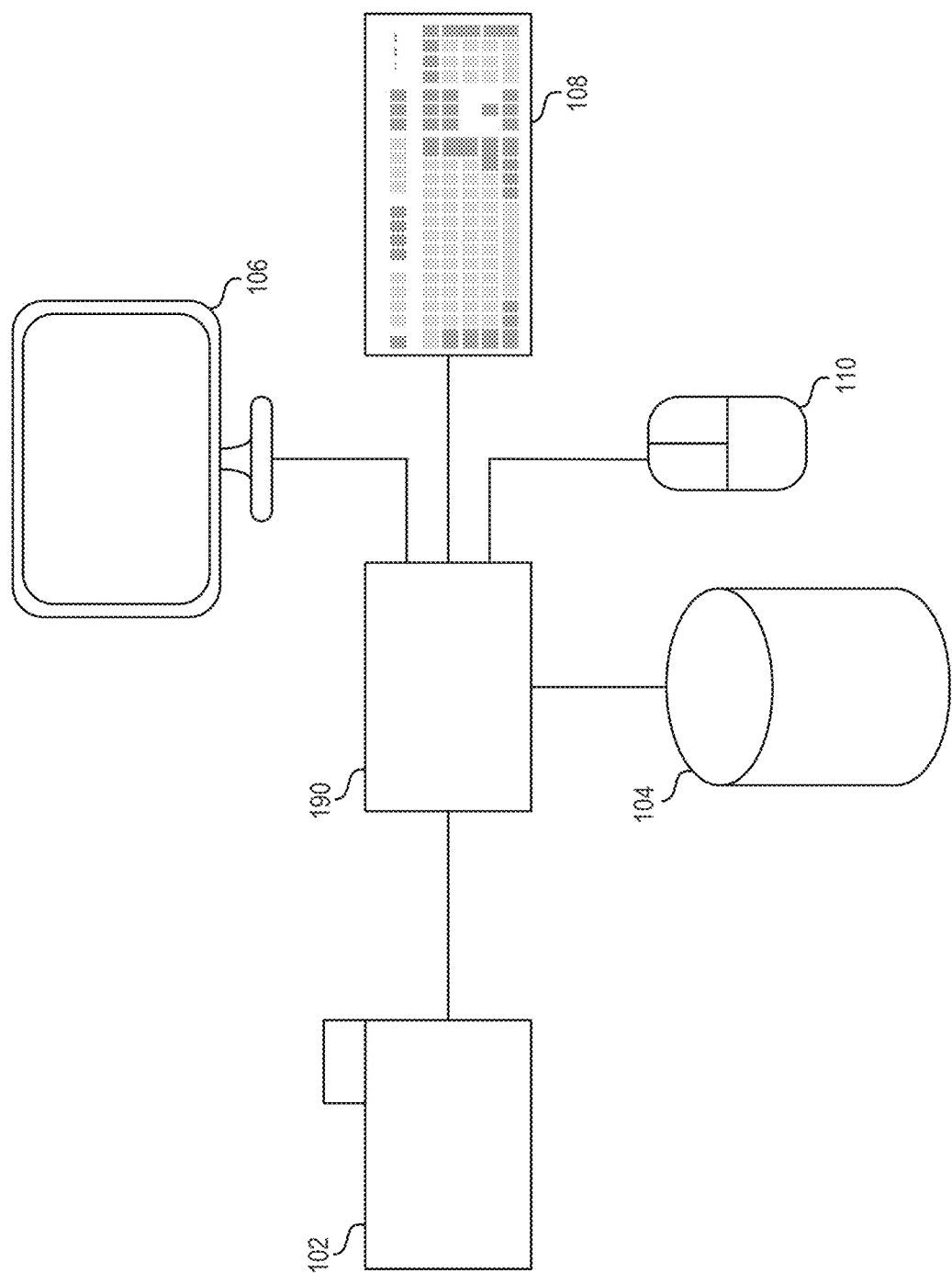
FIG. 1 shows a functional block diagram for one example of a sorting control system for analyzing and displaying biological events.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein and made part of the disclosure herein.

Particle analyzers, such as flow and scanning cytometers, are analytical tools that enable the characterization of particles on the basis of electro-optical measurements such as light scatter and fluorescence. In a flow cytometer, for example, particles, such as molecules, analyte-bound beads, or individual cells, in a fluid suspension are passed by a detection region in which the particles are exposed to an excitation light, typically from one or more lasers, and the light scattering and fluorescence properties of the particles are measured. Particles or components thereof typically are labeled with fluorescent dyes to facilitate detection. A multiplicity of different particles or components can be simultaneously detected by using spectrally distinct fluorescent dyes to label the different particles or components. In some implementations, a multiplicity of photodetectors, one for each of the scatter parameters to be measured, and one or more for each of the distinct dyes to be detected are included in the analyzer. For example, some embodiments include spectral configurations where more than one sensor or detector is used per dye. The data obtained comprise the signals measured for each of the light scatter detectors and the fluorescence emissions.

Particle analyzers can further comprise means for recording the measured data and analyzing the data. For example, data storage and analysis can be carried out using a computer connected to the detection electronics. For example, the data can be stored in tabular form, where each row corresponds to data for one particle, and the columns correspond to each of the measured features. The use of standard file formats, such as a Flow Cytometry Standard ("FCS") file format, for storing data from a particle analyzer facilitates analyzing data using separate programs and/or machines. Using current analysis methods, the data typically are displayed in 1-dimensional histograms or 2-dimensional (2D) plots for ease of visualization, but other methods can be used to visualize multidimensional data.

The parameters measured using, for example, a flow cytometer typically include light scattered by the particle in a narrow angle along a mostly forward direction (referred to as forward scatter (FSC)), light that is scattered by the particle in an orthogonal direction to the excitation laser (referred to as side scatter (SSC)), and the light emitted from fluorescent molecules in one or more detectors that measure signal over a range of spectral wavelengths, or by the fluorescent dye that is primarily detected in that specific detector or array of detectors. Different cell types can be identified by their light scatter characteristics and fluorescence emissions resulting from labeling various cell proteins or other constituents with fluorescent dye-labeled antibodies or other fluorescent probes.

Both flow and scanning cytometers are commercially available from, for example, BD Biosciences (San Jose. Calif.). Flow cytometry is described in, for example, Landy et al. (eds.), Clinical Flow Cytometry. Annals of the New York Academy of Sciences Volume 677 (1993); Bauer et al. (eds.), Clinical Flow Cytometry: Principles and Applications, Williams & Wilkins (1993); Ormerod (ed.), Flow Cytometry: A Practical Approach, Oxford Univ. Press (1994); Jaroszeski et al. (eds.), Flow Cytometry Protocols, Methods in Molecular Biology No. 91. Humana Press (1997); and Practical Shapiro, Flow Cytometry, 4th ed., Wiley-Liss (2003); each of which is incorporated herein by reference. Fluorescence imaging microscopy is described in, for example, Pawley (ed.), Handbook of Biological Confocal Microscopy, 2nd Edition, Plenum Press (1989), incorporated herein by reference.

The data obtained from an analysis of cells (or other particles) by multi-color flow cytometry are multidimensional, where each cell corresponds to a point in a multidimensional space defined by the parameters measured. Populations of cells or particles can be identified as clusters of points in the data space. The identification of clusters and, thereby, populations can be carried out manually by drawing a gate around a population displayed in one or more 2-dimensional plots, referred to as "scatter plots" or "dot plots." of the data. Alternatively, clusters can be identified, and gates that define the limits of the populations, can be determined automatically. Examples of methods for automated gating have been described in, for example, U.S. Pat. Nos. 4,845,653; 5,627,040; 5,739,000; 5,795,727; 5,962,238; 6,014,904; 6,944,338; and 8,990,047; each of which is incorporated herein by reference.

Flow cytometry is a valuable method for the analysis and isolation of biological particles such as cells and constituent molecules. As such it has a wide range of diagnostic and therapeutic applications. The method utilizes a fluid stream to linearly segregate particles such that they can pass, single file, through a detection apparatus. Individual cells can be distinguished according to their location in the fluid stream and the presence of detectable markers. Thus, a flow cytometer can be used to characterize and produce a diagnostic profile of a population of biological particles.

Isolation of biological particles has been achieved by adding a sorting or collection capability to flow cytometers. Particles in a segregated stream, detected as having one or more desired characteristics, can be individually isolated from the sample stream by mechanical or electrical separation. This method of flow sorting has been used to sort cells of different types, to separate sperm bearing X and Y chromosomes for animal breeding, to sort chromosomes for genetic analysis, and to isolate particular organisms from complex biological population.

Gating can be used to classify and help make sense of the large quantity of data that can be generated from a sample. Given the large quantities of data presented for a given sample, there exists a need to efficiently control the graphical display of the data.

Fluorescence-activated particle sorting or cell sorting is a specialized type of flow cytometry. Fluorescence-activated particle sorting or cell sorting provides a method for sorting a heterogeneous mixture of particles into one or more containers, one cell at a time, based upon the specific light scattering and fluorescent characteristics of each cell. It records fluorescent signals from individual cells, and physically separates cells of particular interest. The acronym FACS is trademarked and owned by Becton, Dickinson and Company (Franklin Lakes, N.J.) and can be used to refer to devices for performing fluorescence-activated particle sorting or cell sorting.

The particle suspension is placed near the center of a narrow, rapidly flowing stream of liquid. The flow is arranged so that on the average there is a large separation between particles relative to their diameter as they arrive stochastically (e.g., a Poisson process) into the detection region. A vibrating mechanism can cause the emerging fluid stream to break off in a stable manner into individual droplets that contain particles previously characterized in the detection region. The system can generally be adjusted so that there is a low probability of more than one particle being in a droplet. If a particle is classified to be collected, a charge can be applied to the flow cell and emerging stream during the period of time one or more drops form and break off from the stream. These charged droplets then move through an electrostatic deflection system that diverts droplets into target containers based upon the charge applied to the droplet.

A sample can include thousands if not millions of cells. Cells can be sorted to purify a sample to the cells of interest. The sorting process can generally identify three varieties of cells: cells of interest, cells which are not of interests, and cells which cannot be identified. In order to sort cells with high purity (e.g., high concentration of cells of interest), droplet generating cell sorters can abort the sort electronically if the desired cells are too close to another unwanted cell and thereby reduce contamination of the sorted populations by any inadvertent inclusion of an unwanted particle within the droplet containing the particle of interest.

Disclosed herein include embodiments of a method for displaying and editing spillover values. In some embodiments, the method is under control of a processor (e.g., a hardware processor or a virtual processor) and comprises: causing display a view of a spillover editor comprising a triangular grid of a plurality of rows and a plurality of columns each comprising at least one display area of a first plurality of display areas with a background color of the display area. Each of the plurality of rows and the plurality of columns can represent a fluorophore of a first plurality of fluorophores. Each of the plurality of rows and the plurality of columns can be associated with a header information object of the fluorophore represented by the row and column, respectively. Each of the first plurality of display areas can be in a row of the plurality of rows and a column of the plurality of columns. Each of the first plurality of display areas can represent the two fluorophores of the first plurality of fluorophores represented by the row and the column the display area is in. Each of the first plurality of display areas can comprise (i) a first plot of a plurality of first plots related to the two fluorophores represented by the first plot and (ii) two spillover value information objects, each comprising a spillover value associated with the fluorophores represented by the display area, at a first spillover value information object location and a second spillover value information object location. The numbers of the one or more display areas of two adjacent rows of the plurality of rows and two adjacent columns of the plurality of columns can differ by at least one. The method can comprise: receiving a selection event of a selected display area of the first plurality of display areas in a selected row of the plurality of rows and a selected column of the plurality of columns. The method can comprise: causing display a selected view of the spillover editor comprising the selected display area comprising (i) the first plot of the selected display area and (ii) label information objects of the fluorophores represented by the selected display area at a first label information object location and a second label information object location of the selected display area. The method can comprise: receiving an adjusted spillover value of a first spillover value information object of the two spillover value information objects of the selected display area. The method can comprise: causing display a first adjusted view of the spillover editor comprising the first plurality of display areas each comprising (i) a second plot related to the corresponding first plot generated based on the adjusted spillover value and (ii) the two spillover information objects of the display area at the first spillover value information object location and the second spillover value information object location. The selected display area can have an adjusted background color of the display area and comprise (i) the adjusted spillover value of the first spillover value information object at the first spillover value information object location and (ii) the spillover value of the first spillover value information object at the first label information object location.

Disclosed herein include embodiments of a method for displaying and editing spillover values. In some embodiments, the method is under control of a processor (e.g., a hardware processor or a virtual processor) and comprises: causing display a view of a spillover editor comprising a triangular grid of a plurality of rows and a plurality of columns each comprising at least one display area of a first plurality of display areas with a background color of the display area. Each of the plurality of rows and the plurality of columns can represent a fluorophore of a first plurality of fluorophores. Each of the plurality of rows and the plurality of columns can be associated with a header information object of the fluorophore represented by the row and column, respectively. Each of the first plurality of display areas can be in a row of the plurality of rows and a column of the plurality of columns. Each of the first plurality of display areas can represent the two fluorophores of the first plurality of fluorophores represented by the row and the column the display area is in, wherein each of the first plurality of display areas comprises (i) a first plot of a plurality of first plots and (ii) two spillover value information objects, comprising two spillover values associated with the fluorophores represented by the display area, at a first spillover value information object location and a second spillover value information object location. The method can comprise receiving an adjusted spillover value of a first spillover value information object of the two spillover value information objects of a selected display area of the first plurality of display areas in a selected row of the plurality of rows and a selected column of the plurality of columns. The method can comprise causing display a first adjusted view the spillover editor comprising the first plurality of display areas each comprising (i) a second plot related to the corresponding first plot generated based on the adjusted spillover value and (ii) the two spillover information objects of the display area at the first spillover value information object location and the second spillover value information object location. The selected display area cab have an adjusted background color of the display area and comprises (i) the adjusted spillover value of the first spillover value information object at the first spillover value information object location and (ii) the spillover value of the first spillover value information object at the first label information object location. The numbers of the one or more display areas of two adjacent rows of the plurality of rows and two adjacent columns of the plurality of columns can differ by at least one. The method can comprise receiving a selection event of the selected display area of the first plurality of display areas in the selected row of the plurality of rows and the selected column of the plurality of columns. The method can comprise causing display a selected view of the spillover editor comprising the selected display area comprising (i) the first plot of the selected display area and (ii) label information objects of the fluorophores represented by the selected display area at a first label information object location and a second label information object location of the selected display area.

Disclosed herein include embodiments of computing system for displaying and editing spillover values. In some embodiments, the computing system can comprise: non-transitory memory configured to store executable instructions; a display; and a processor (e.g., a hardware processor or a virtual processor) in communication with the non-transitory memory and the display, the processor programmed by the executable instructions to: cause the display to render a view of a spillover editor comprising a triangular grid of a plurality of rows and a plurality of columns each comprising at least one display area of a first plurality of display areas with a background color of the display area. Each of the plurality of rows and the plurality of columns can represent a fluorophore of a first plurality of fluorophores. Each of the plurality of rows and the plurality of columns can be associated with a header information object of the fluorophore represented by the row and column, respectively. Each of the first plurality of display areas can be in a row of the plurality of rows and a column of the plurality of columns. Each of the first plurality of display areas can represent the two fluorophores of the first plurality of fluorophores represented by the row and the column the display area is in. Each of the first plurality of display areas can comprise (i) a first plot of a plurality of first plots related to the two fluorophores represented by the first plot and (ii) two spillover value information objects, each comprising a spillover value associated with the fluorophores represented by the display area, at a first spillover value information object location and a second spillover value information object location. The numbers of the one or more display areas of two adjacent rows of the plurality of rows and two adjacent columns of the plurality of columns can differ by at least one. The processor can be programmed by the executable instructions to: receive a selection event of a selected display area of the first plurality of display areas in a selected row of the plurality of rows and a selected column of the plurality of columns. The processor can be programmed by the executable instructions to: cause the display to render a selected view of the spillover editor comprising the selected display area comprising (i) the first plot of the selected display area and (ii) label information objects of the fluorophores represented by the selected display area at a first label information object location and a second label information object location of the selected display area. The processor can be programmed by the executable instructions to: receive an adjusted spillover value of a first spillover value information object of the two spillover value information objects of the selected display area. The processor can be programmed by the executable instructions to: cause the display to render a first adjusted view of the spillover editor comprising the first plurality of display areas each comprising (i) a second plot related to the corresponding first plot generated based on the adjusted spillover value and (ii) the two spillover information objects of the display area at the first spillover value information object location and the second spillover value information object location. The selected display area has an adjusted background color of the display area and can comprise (i) the adjusted spillover value of the first spillover value information object at the first spillover value information object location and (ii) the spillover value of the first spillover value information object at the first label information object location.

Disclosed herein include embodiments of computing system for displaying and editing spillover values. In some embodiments, the computing system can comprise: non-transitory memory configured to store executable instructions; a display; and a processor (e.g., a hardware processor or a virtual processor) in communication with the non-transitory memory and the display, the processor programmed by the executable instructions to: cause the display to render a view of a spillover editor comprising a triangular grid of a plurality of rows and a plurality of columns each comprising at least one display area of a first plurality of display areas with a background color of the display area. Each of the plurality of rows and the plurality of columns can represent a fluorophore of a first plurality of fluorophores. Each of the plurality of rows and the plurality of columns can be associated with a header information object of the fluorophore represented by the row and column, respectively. Each of the first plurality of display areas can be in a row of the plurality of rows and a column of the plurality of columns. Each of the first plurality of display areas can represent the two fluorophores of the first plurality of fluorophores represented by the row and the column the display area is in. Each of the first plurality of display areas can comprise (i) a first plot of a plurality of first plots and (ii) two spillover value information objects, comprising two spillover values associated with the fluorophores represented by the display area, at a first spillover value information object location and a second spillover value information object location. The processor can be programmed by the executable instructions to: receive an adjusted spillover value of a first spillover value information object of the two spillover value information objects of a selected display area of the first plurality of display areas in a selected row of the plurality of rows and a selected column of the plurality of columns. The processor can be programmed by the executable instructions to: cause the display to render a first adjusted view the spillover editor comprising the first plurality of display areas each comprising (i) a second plot related to the corresponding first plot generated based on the adjusted spillover value and (ii) the two spillover information objects of the display area at the first spillover value information object location and the second spillover value information object location. The selected display area can have an adjusted background color of the display area and comprises (i) the adjusted spillover value of the first spillover value information object at the first spillover value information object location and (ii) the spillover value of the first spillover value information object at the first label information object location. The numbers of the one or more display areas of two adjacent rows of the plurality of rows and two adjacent columns of the plurality of columns can differ by at least one. The hardware processor can be programmed by the executable instructions to: receive a selection event of the selected display area of the first plurality of display areas in the selected row of the plurality of rows and the selected column of the plurality of columns; and cause the display to render a selected view of the spillover editor comprising the selected display area comprising (i) the first plot of the selected display area and (ii) label information objects of the fluorophores represented by the selected display area at a first label information object location and a second label information object location of the selected display area.

Disclosed herein include embodiments of a spillover editor. In some embodiments, a view of a spillover editor comprises a triangular grid of a plurality of rows and a plurality of columns each comprising at least one display area of a first plurality of display areas with a background area of the display area. Each of the plurality of rows and the plurality of columns can represent a fluorophore of a first plurality of fluorophores. Each of the plurality of rows and the plurality of columns can be associated with a header information object of the fluorophore represented by the row and column, respectively. Each of the first plurality of display areas can be in a row of the plurality of rows and a column of the plurality of columns. Each of the first plurality of display areas can represent the two fluorophores of the first plurality of fluorophores represented by the row and the column the display area is in. Each of the first plurality of display areas can comprise (i) a first plot of a plurality of first plots related to the two fluorophores represented by the first plot and (ii) two spillover value information objects, each comprising a spillover value associated with the fluorophores represented by the display area, at a first spillover value information object location and a second spillover value information object location. The numbers of the one or more display areas of two adjacent rows of the plurality of rows and two adjacent columns of the plurality of columns can differ by at least one. In some embodiments, a selected view of the spillover editor can comprise a selected display area comprising (i) the first plot of the selected display area and (ii) label information objects of the fluorophores represented by the selected display area at a first label information object location and a second label information object location of the selected display area. In some embodiments, a first adjusted view of the spillover editor comprises the first plurality of display areas each comprising (i) a second plot related to the corresponding first plot generated based on an adjusted spillover value and (ii) the two spillover information objects of the display area at the first spillover value information object location and the second spillover value information object location. The selected display area can have an adjusted background color of the display area and comprise (i) the adjusted spillover value of the first spillover value information object at the first spillover value information object location and (ii) the spillover value of the first spillover value information object at the first label information object location.

Definitions

As used herein, the terms set forth with particularity below have the following definitions. If not otherwise defined in this section, all terms used herein have the meaning commonly understood by a person skilled in the arts to which this invention belongs.

As used herein, "system," "instrument," "apparatus," and "device" generally encompass both the hardware (e.g., mechanical and electronic) and, in some implementations, associated software (e.g., specialized computer programs for graphics control) components.

As used herein, an "event" or "event data" generally refers to the data (e.g., assembled packet of data) measured from a single particle, such as cells or synthetic particles. Typically, the data measured from a single particle include a number of parameters or features, including one or more light scattering parameters or features, and at least one other parameter or feature derived from fluorescence detected from the particle such as the intensity of the fluorescence. Thus, each event can be represented as a vector of parameter and feature measurements, wherein each measured parameter or feature corresponds to one dimension of the data space. In some embodiments, the data measured from a single particle include image, electric, temporal, or acoustic data. An event can be associated with an experiment, an assay, or a sample source which can be identified in association with the measurement data.

As used herein, a "population", or "subpopulation" of particles, such as cells or other particles, generally refers to a group of particles that possess properties (for example, optical, impedance, or temporal properties) with respect to one or more measured parameters such that measured parameter data form a cluster in the data space. Thus, populations can be recognized as clusters in the data. Conversely, each data cluster generally is interpreted as corresponding to a population of a particular type of cell or particle, although clusters that correspond to noise or background typically also are observed. A cluster can be defined in a subset of the dimensions, e.g., with respect to a subset of the measured parameters, which corresponds to populations that differ in only a subset of the measured parameters or features extracted from the measurements of the cell or particle.

As used herein, a "gate" generally refers to a classifier boundary identifying a subset of data of interest. In cytometry, a gate can bound a group of events of particular interest. As used herein, "gating" generally refers to the process of classifying the data using a defined gate for a given set of data, where the gate can be one or more regions of interest combined with Boolean logic.

Specific examples of various embodiments and systems in which they are implemented are described further below.

Sorting Control System

FIG. 1 shows a functional block diagram for one example of a sorting control system, such as an analytics controller 100, for analyzing and displaying biological events. An analytics controller 100 can be configured to implement a variety of processes for controlling graphic display of biological events.

A particle analyzer or sorting system 102 can be configured to acquire biological event data. For example, a flow cytometer can generate flow cytometric event data. The particle analyzer 102 can be configured to provide biological event data to the analytics controller 100. A data communication channel can be included between the particle analyzer 102 and the analytics controller 100. The biological event data can be provided to the analytics controller 100 via the data communication channel.

The analytics controller 100 can be configured to receive biological event data from the particle analyzer 102. The biological event data received from the particle analyzer 102 can include flow cytometric event data. The analytics controller 100 can be configured to provide a graphical display including a first plot of biological event data to a display device 106. The analytics controller 100 can be further configured to render a region of interest as a gate around a population of biological event data shown by the display device 106, overlaid upon the first plot, for example. In some embodiments, the gate can be a logical combination of one or more graphical regions of interest drawn upon a single parameter histogram or bivariate plot.

The analytics controller 100 can be further configured to display the biological event data on the display device 106 within the gate differently from other events in the biological event data outside of the gate. For example, the analytics controller 100 can be configured to render the color of biological event data contained within the gate to be distinct from the color of biological event data outside of the gate. The display device 106 can be implemented as a monitor, a tablet computer, a smartphone, or other electronic device configured to present graphical interfaces.

The analytics controller 100 can be configured to receive a gate selection signal identifying the gate from a first input device. For example, the first input device can be implemented as a mouse 110. The mouse 110 can initiate a gate selection signal to the analytics controller 100 identifying the gate to be displayed on or manipulated via the display device 106 (e.g., by clicking on or in the desired gate when the cursor is positioned there). In some implementations, the first device can be implemented as the keyboard 108 or other means for providing an input signal to the analytics controller 100 such as a touchscreen, a stylus, an optical detector, or a voice recognition system. Some input devices can include multiple inputting functions. In such implementations, the inputting functions can each be considered an input device. For example, as shown in FIG. 1, the mouse 110 can include a right mouse button and a left mouse button, each of which can generate a triggering event.

The triggering event can cause the analytics controller 100 to alter the manner in which the data is displayed, which portions of the data is actually displayed on the display device 106, and/or provide input to further processing such as selection of a population of interest for particle sorting.

In some embodiments, the analytics controller 100 can be configured to detect when gate selection is initiated by the mouse 110. The analytics controller 100 can be further configured to automatically modify plot visualization to facilitate the gating process. The modification can be based on the specific distribution of biological event data received by the analytics controller 100.

The analytics controller 100 can be connected to a storage device 104. The storage device 104 can be configured to receive and store biological event data from the analytics controller 100. The storage device 104 can also be configured to receive and store flow cytometric event data from the analytics controller 100. The storage device 104 can be further configured to allow retrieval of biological event data, such as flow cytometric event data, by the analytics controller 100.

A display device 106 can be configured to receive display data from the analytics controller 100. The display data can comprise plots of biological event data and gates outlining sections of the plots. The display device 106 can be further configured to alter the information presented according to input received from the analytics controller 100 in conjunction with input from the particle analyzer 102, the storage device 104, the keyboard 108, and/or the mouse 110.

In some implementations the analytics controller 100 can generate a user interface to receive example events for sorting. For example, the user interface can include a control for receiving example events or example images. The example events or images or an example gate can be provided prior to collection of event data for a sample, or based on an initial set of events for a portion of the sample.

Particle Sorter System

A common flow sorting technique which can be referred to as "electrostatic cell sorting," utilizes droplet sorting in which a stream or moving fluid column containing linearly segregated particles is broken into drops and the drops containing particles of interest are electrically charged and deflected into a collection tube by passage through an electric field. Droplet sorting systems are capable of forming drops at a rate of 100,000 drops/second in a fluid stream that is passed through a nozzle having a diameter less than 100 micrometers. Droplet sorting typically requires that the drops break off from the stream at a fixed distance from the nozzle tip. The distance is normally on the order of a few millimeters from the nozzle tip and can be stabilized and maintained for an unperturbed fluid stream by oscillating the nozzle tip at a predefined frequency with an amplitude to hold the break-off constant. For example, in some embodiments, adjusting amplitude of a sine wave shaped voltage pulse at a given frequency holds the break-off stable and constant.

Typically, the linearly entrained particles in the stream are characterized as they pass through an observation point situated within a flow cell or cuvette, or just below the nozzle tip. Once a particle is identified as meeting one or more desired criteria, the time at which it will reach the drop break-off point and break from the stream in a drop can be predicted. Ideally, a brief charge is applied to the fluid stream just before the drop containing the selected particle breaks from the stream and then grounded immediately after the drop breaks off. The drop to be sorted maintains an electrical charge as it breaks off from the fluid stream, and all other drops are left uncharged. The charged drop is deflected sideways from the downward trajectory of the other drops by an electrical field and collected in a sample tube. The uncharged drops fall directly into a drain.

Figure 2A:
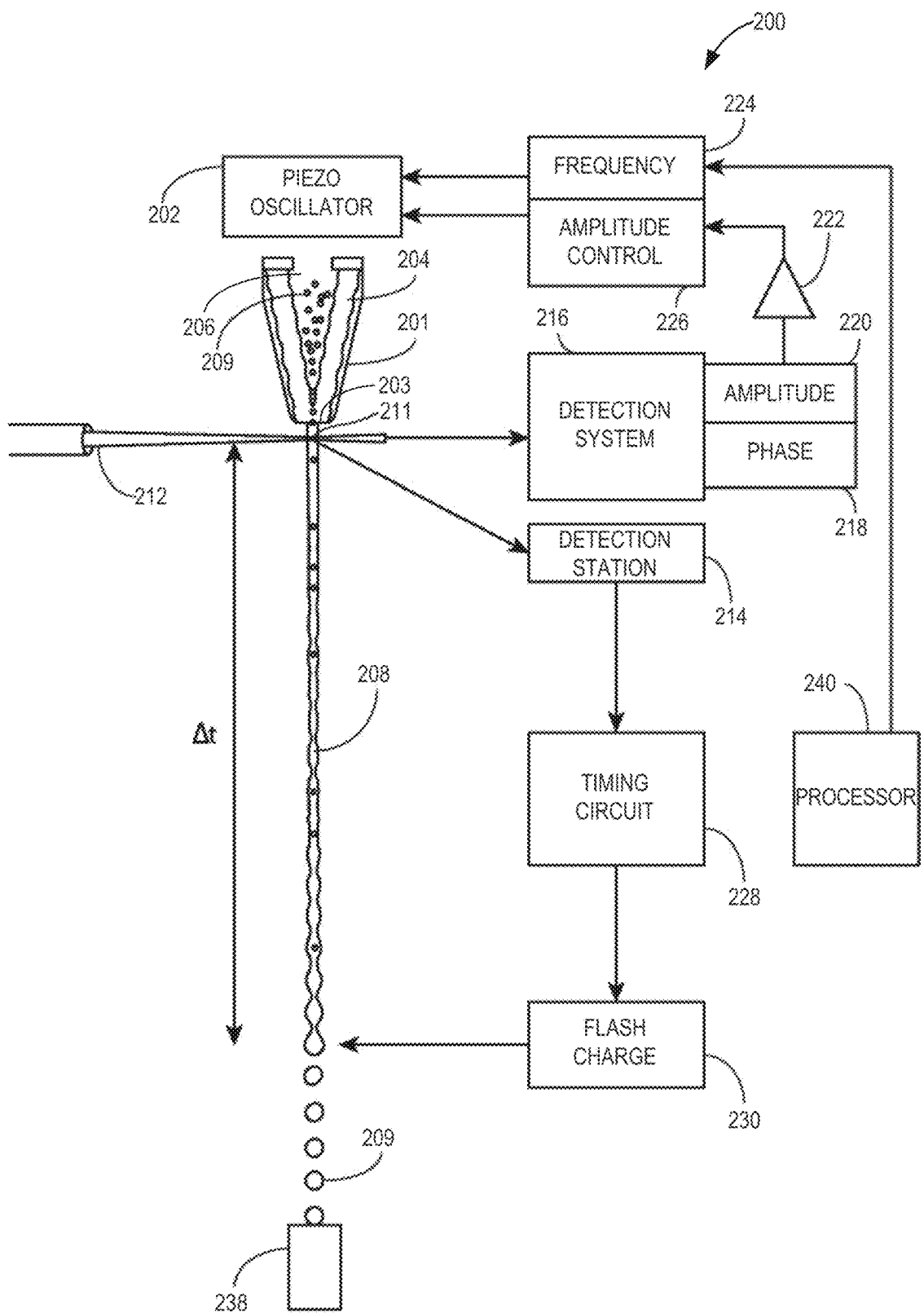
FIG. 2A is a schematic drawing of a particle sorter system, in accordance with one embodiment presented herein

FIG. 2A is a schematic drawing of a particle sorter system 200 (e.g., the particle analyzer 102) in accordance with one embodiment presented herein. In some embodiments, the particle sorter system 200 is a cell sorter system. As shown in FIG. 2A, a drop formation transducer 202 (e.g., piezo-oscillator) is coupled to a fluid conduit 201, which can be coupled to, can include, or can be, a nozzle 203. Within the fluid conduit 201, sheath fluid 204 hydrodynamically focuses a sample fluid 206 comprising particles 209 into a moving fluid column 208 (e.g. a stream). Within the moving fluid column 208, particles 209 (e.g., cells) are lined up in single file to cross a monitored area 211 (e.g., where laser-stream intersect), irradiated by an irradiation source 212 (e.g., a laser). Vibration of the drop formation transducer 202 causes moving fluid column 208 to break into a plurality of drops 210, some of which contain particles 209.

In operation, a detection station 214 (e.g., an event detector) identifies when a particle of interest (or cell of interest) crosses the monitored area 211. Detection station 214 feeds into a timing circuit 228, which in turn feeds into a flash charge circuit 230. At a drop break off point, informed by a timed drop delay (Δt), a flash charge can be applied to the moving fluid column 208 such that a drop of interest carries a charge. The drop of interest can include one or more particles or cells to be sorted. The charged drop can then be sorted by activating deflection plates (not shown) to deflect the drop into a vessel such as a collection tube or a multi-well or microwell sample plate where a well or microwell can be associated with drops of particular interest. As shown in FIG. 2A, the drops can be collected in a drain receptacle 238.

A detection system 216 (e.g. a drop boundary detector) serves to automatically determine the phase of a drop drive signal when a particle of interest passes the monitored area 211. An exemplary drop boundary detector is described in U.S. Pat. No. 7,679,039, which is incorporated herein by reference in its entirety. The detection system 216 allows the instrument to accurately calculate the place of each detected particle in a drop. The detection system 216 can feed into an amplitude signal 220 and/or phase 218 signal, which in turn feeds (via amplifier 222) into an amplitude control circuit 226 and/or frequency control circuit 224. The amplitude control circuit 226 and/or frequency control circuit 224, in turn, controls the drop formation transducer 202. The amplitude control circuit 226 and/or frequency control circuit 224 can be included in a control system.

In some implementations, sort electronics (e.g., the detection system 216, the detection station 214 and a processor 240) can be coupled with a memory configured to store the detected events and a sort decision based thereon. The sort decision can be included in the event data for a particle. In some implementations, the detection system 216 and the detection station 214 can be implemented as a single detection unit or communicatively coupled such that an event measurement can be collected by one of the detection system 216 or the detection station 214 and provided to the non-collecting element.

Figure 2B:
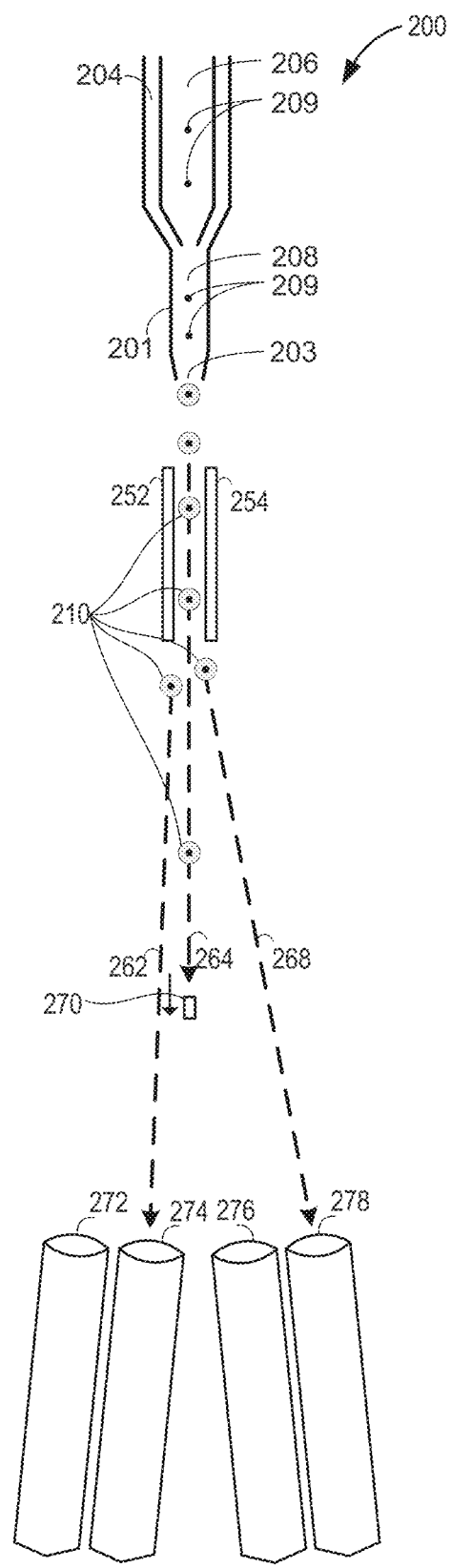
FIG. 2B is a schematic drawing of another particle sorter system, in accordance with one embodiment presented herein.

FIG. 2B is a schematic drawing of a particle sorter system, in accordance with one embodiment presented herein. The particle sorter system 200 shown in FIG. 2B, includes deflection plates 252 and 254. A charge can be applied via a stream-charging wire in a barb. This creates a stream of droplets 210 containing particles 210 for analysis. The particles can be illuminated with one or more light sources (e.g., lasers) to generate light scatter and fluorescence information. The information for a particle is analyzed such as by sorting electronics or other detection system (not shown in FIG. 2B). The deflection plates 252 and 254 can be independently controlled to attract or repel the charged droplet to guide the droplet toward a destination collection receptacle (e.g., one of 272, 274, 276, or 278). As shown in FIG. 2B, the deflection plates 252 and 254 can be controlled to direct a particle along a first path 262 toward the receptacle 274 or along a second path 268 toward the receptacle 278. If the particle is not of interest (e.g., does not exhibit scatter or illumination information within a specified sort range), deflection plates may allow the particle to continue along a flow path 264. Such uncharged droplets may pass into a waste receptacle such as via aspirator 270.

The sorting electronics can be included to initiate collection of measurements, receive fluorescence signals for particles, and determine how to adjust the deflection plates to cause sorting of the particles. Example implementations of the embodiment shown in FIG. 2B include the BD FACSAria™ line of flow cytometers commercially provided by Becton, Dickinson and Company (Franklin Lakes, N.J.).

In some embodiments, one or more components described for the particle sorter system 200 can be used to analyze and characterize particles, with or without physically sorting the particles into collection vessels. Likewise, one or more components described below for the particle analysis system 300 (FIG. 3) can be used to analyze and characterize particles, with or without physically sorting the particles into collection vessels. For example, particles can be grouped or displayed in a tree that includes at least three groups as described herein, using one or more of the components of the particle sorter system 200 or particle analysis system 300.

Figure 3:
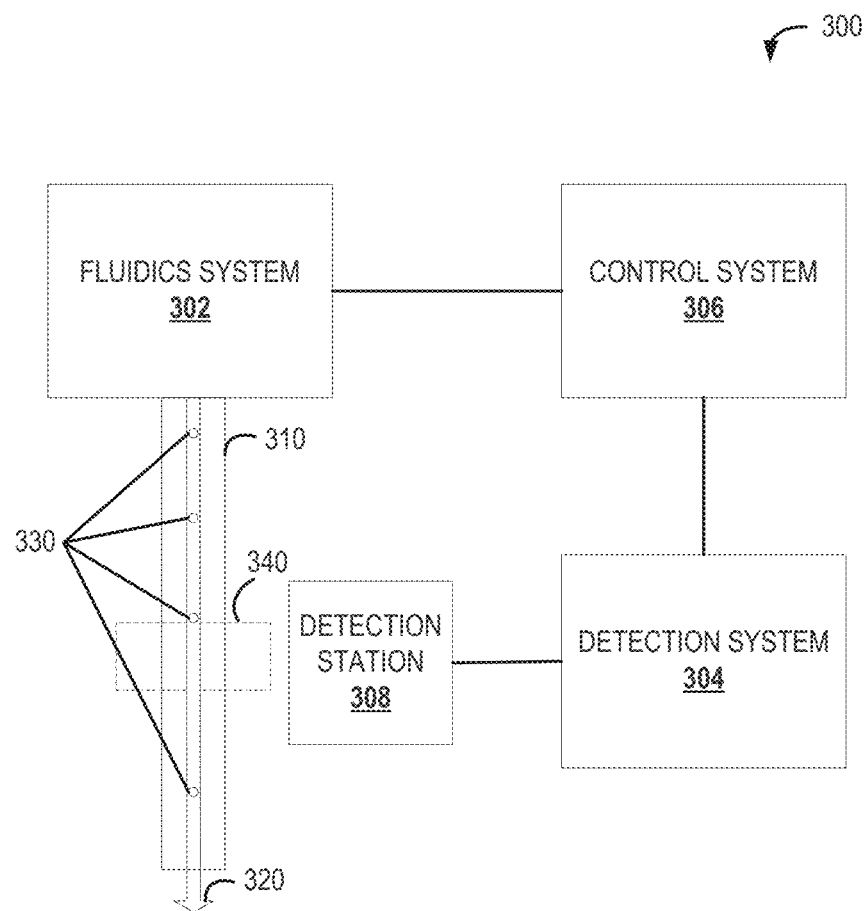
FIG. 3 shows a functional block diagram of a particle analysis system for computational based sample analysis and particle characterization.

FIG. 3 shows a functional block diagram of a particle analysis system for computational based sample analysis and particle characterization. In some embodiments, the particle analysis system 300 is a flow system. The particle analysis system 300 shown in FIG. 3 can be configured to perform, in whole or in part, the methods described herein such as. The particle analysis system 300 includes a fluidics system 302. The fluidics system 302 can include or be coupled with a sample tube 310 and a moving fluid column within the sample tube in which particles 330 (e.g. cells) of a sample move along a common sample path 320.

The particle analysis system 300 includes a detection system 304 configured to collect a signal from each particle as it passes one or more detection stations along the common sample path. A detection station 308 generally refers to a monitored area 340 of the common sample path. Detection can, in some implementations, include detecting light or one or more other properties of the particles 330 as they pass through a monitored area 340. In FIG. 3, one detection station 308 with one monitored area 340 is shown. Some implementations of the particle analysis system 300 can include multiple detection stations. Furthermore, some detection stations can monitor more than one area.

Each signal is assigned a signal value to form a data point for each particle. As described above, this data can be referred to as event data. The data point can be a multidimensional data point including values for respective properties measured for a particle. The detection system 304 is configured to collect a succession of such data points in a first time interval.

The particle analysis system 300 can also include a control system 306. The control system 306 can include one or more processors, an amplitude control circuit 226 and/or a frequency control circuit 224 as shown in FIG. 2B. The control system 206 shown can be operationally associated with the fluidics system 302. The control system 206 can be configured to generate a calculated signal frequency for at least a portion of the first time interval based on a Poisson distribution and the number of data points collected by the detection system 304 during the first time interval. The control system 306 can be further configured to generate an experimental signal frequency based on the number of data points in the portion of the first time interval. The control system 306 can additionally compare the experimental signal frequency with that of a calculated signal frequency or a predetermined signal frequency.

Particle Sorter Illumination and Detection

Figure 4:
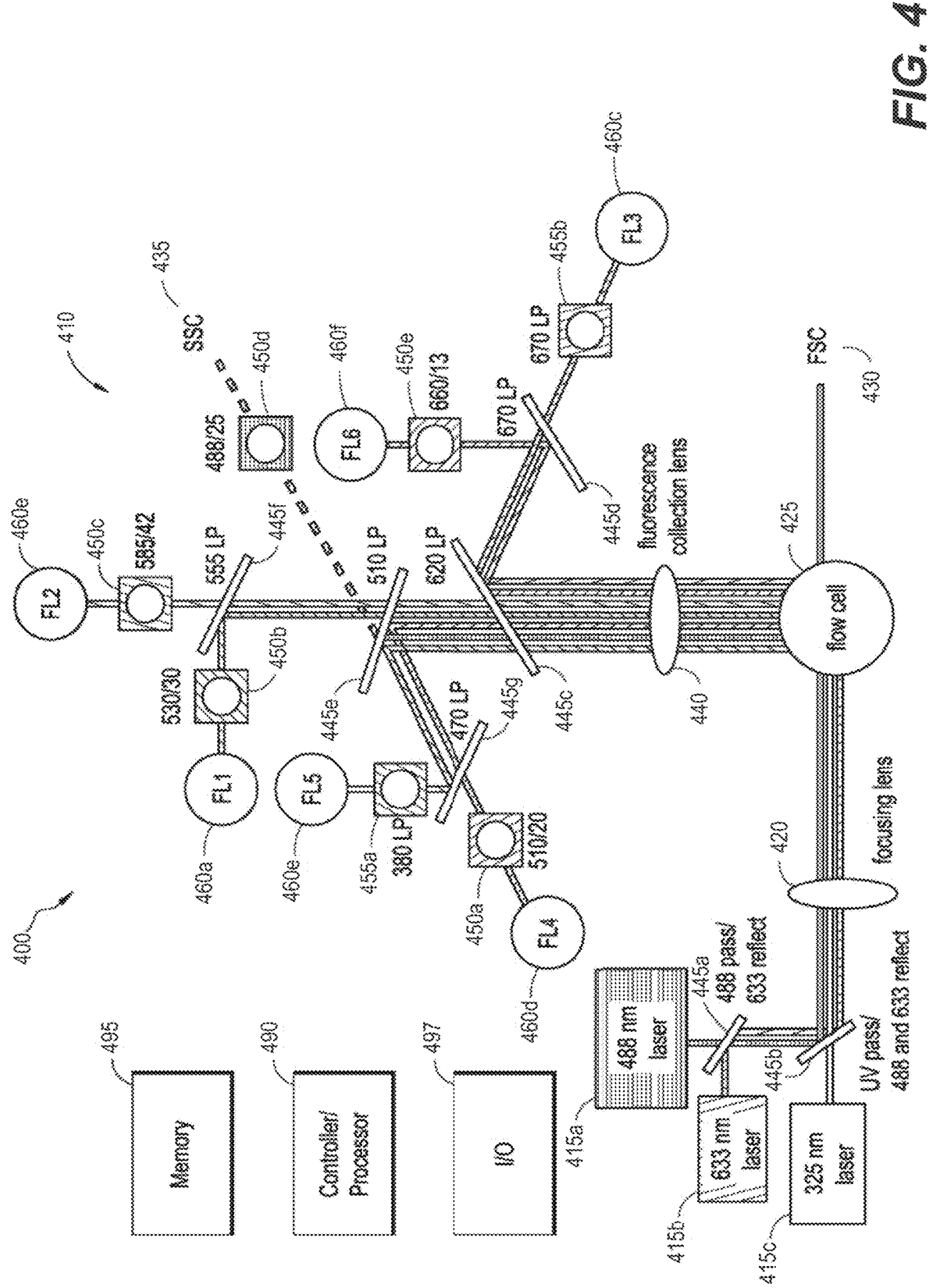
FIG. 4 depicts a flow cytometer in accordance with an illustrative embodiment of the present invention.

FIG. 4 shows a system 400 for flow cytometry in accordance with an illustrative embodiment of the present invention. The system 400 includes a flow cytometer 410, a controller/processor 490 and a memory 495. The flow cytometer 410 includes one or more excitation lasers 415a-415c, a focusing lens 420, a flow chamber 425, a forward scatter detector 430, a side scatter detector 435, a fluorescence collection lens 440, one or more beam splitters 445a-445g, one or more bandpass filters 450a-450e, one or more longpass ("LP") filters 455a-455b, and one or more fluorescent detectors 460a-460f.

The excitation lasers 115a-c emit light in the form of a laser beam. The wavelengths of the laser beams emitted from excitation lasers 415a-415c are 488 nm, 633 nm, and 325 nm, respectively, in the example system of FIG. 4. The laser beams are first directed through one or more of beam splitters 445a and 445b. Beam splitter 445a transmits light at 488 nm and reflects light at 633 nm. Beam splitter 445b transmits UV light (light with a wavelength in the range of 10 to 400 nm) and reflects light at 488 nm and 633 nm.

The laser beams are then directed to a focusing lens 420, which focuses the beams onto the portion of a fluid stream where particles of a sample are located, within the flow chamber 425. The flow chamber is part of a fluidics system which directs these particles, typically one at a time, in a stream to the focused laser beam for interrogation. The flow chamber can comprise a flow cell in a benchtop cytometer or a nozzle tip in a stream-in-air cytometer.

The light from the laser beam(s) interacts with the particles in the sample by diffraction, refraction, reflection, scattering, and absorption with re-emission at various different wavelengths depending on the characteristics of the particle such as its size, internal structure, and the presence of one or more fluorescent molecules attached to or naturally present on or in the particle. The fluorescence emissions as well as the diffracted light, refracted light, reflected light, and scattered light may be routed to one or more of the forward scatter detector 430, the side scatter detector 435, and the one or more fluorescent detectors 460a-460f through one or more of the beam splitters 445a-445g, the bandpass filters 450a-450e, the longpass filters 455a-455b, and the fluorescence collection lens 440.

The fluorescence collection lens 440 collects light emitted from the particle-laser beam interaction and routes that light towards one or more beam splitters and filters. Bandpass filters, such as bandpass filters 450a-450e, allow a narrow range of wavelengths to pass through the filter. For example, bandpass filter 450a is a 510/20 filter. The first number represents the center of a spectral band. The second number provides a range of the spectral band. Thus, a 510/20 filter extends 10 nm on each side of the center of the spectral band, or from 500 nm to 520 nm. Shortpass filters transmit wavelengths of light equal to or shorter than a specified wavelength. Longpass filters, such as longpass filters 455a-455b, transmit wavelengths of light equal to or longer than a specified wavelength of light. For example, longpass filter 455a, which is a 670 nm longpass filter, transmits light equal to or longer than 670 nm. Filters are often selected to optimize the specificity of a detector for a particular fluorescent dye. The filters can be configured so that the spectral band of light transmitted to the detector is close to the emission peak of a fluorescent dye.

Beam splitters direct light of different wavelengths in different directions. Beam splitters can be characterized by filter properties such as shortpass and longpass. For example, beam splitter 445g is a 620 SP beam splitter, meaning that the beam splitter 445g transmits wavelengths of light that are 620 nm or shorter and reflects wavelengths of light that are longer than 620 nm in a different direction. In one embodiment, the beam splitters 445a-445g can comprise optical mirrors, such as dichroic mirrors.

The forward scatter detector 430 is positioned slightly off axis from the direct beam through the flow cell and is configured to detect diffracted light, the excitation light that travels through or around the particle in mostly a forward direction. The intensity of the light detected by the forward scatter detector is dependent on the overall size of the particle. The forward scatter detector can include a photodiode. The side scatter detector 435 is configured to detect refracted and reflected light from the surfaces and internal structures of the particle, and tends to increase with increasing particle complexity of structure. The fluorescence emissions from fluorescent molecules associated with the particle can be detected by the one or more fluorescent detectors 460a-460f. The side scatter detector 435 and fluorescent detectors can include photomultiplier tubes. The signals detected at the forward scatter detector 430, the side scatter detector 435 and the fluorescent detectors can be converted to electronic signals (voltages) by the detectors. This data can provide information about the sample.

One of skill in the art will recognize that a flow cytometer in accordance with an embodiment of the present invention is not limited to the flow cytometer depicted in FIG. 4, but can include any flow cytometer known in the art. For example, a flow cytometer may have any number of lasers, beam splitters, filters, and detectors at various wavelengths and in various different configurations.

In operation, cytometer operation is controlled by a controller/processor 490, and the measurement data from the detectors can be stored in the memory 495 and processed by the controller/processor 490. Although not shown explicitly, the controller/processor 190 is coupled to the detectors to receive the output signals therefrom, and may also be coupled to electrical and electromechanical components of the flow cytometer 400 to control the lasers, fluid flow parameters, and the like. Input/output (I/O) capabilities 497 may be provided also in the system. The memory 495, controller/processor 490, and I/O 497 may be entirely provided as an integral part of the flow cytometer 410. In such an embodiment, a display may also form part of the I/O capabilities 497 for presenting experimental data to users of the cytometer 400. Alternatively, some or all of the memory 495 and controller/processor 490 and I/O capabilities may be part of one or more external devices such as a general purpose computer. In some embodiments, some or all of the memory 495 and controller/processor 490 can be in wireless or wired communication with the cytometer 410. The controller/processor 490 in conjunction with the memory 495 and the I/O 497 can be configured to perform various functions related to the preparation and analysis of a flow cytometer experiment.

The system illustrated in FIG. 4 includes six different detectors that detect fluorescent light in six different wavelength bands (which may be referred to herein as a "filter window" for a given detector) as defined by the configuration of filters and/or splitters in the beam path from the flow cell 425 to each detector. Different fluorescent molecules used for a flow cytometer experiment will emit light in their own characteristic wavelength bands. The particular fluorescent labels used for an experiment and their associated fluorescent emission bands may be selected to generally coincide with the filter windows of the detectors. However, as more detectors are provided, and more labels are utilized, perfect correspondence between filter windows and fluorescent emission spectra is not possible. It is generally true that although the peak of the emission spectra of a particular fluorescent molecule may lie within the filter window of one particular detector, some of the emission spectra of that label will also overlap the filter windows of one or more other detectors. This may be referred to as spillover.

The I/O 497 can be configured to receive data regarding a flow cytometer experiment having a panel of fluorescent labels and a plurality of cell populations having a plurality of markers, each cell population having a subset of the plurality of markers. The I/O 497 can also be configured to receive biological data assigning one or more markers to one or more cell populations, marker density data, emission spectrum data, data assigning labels to one or more markers, and cytometer configuration data. Flow cytometer experiment data, such as label spectral characteristics and flow cytometer configuration data can also be stored in the memory 495. The controller/processor 490 can be configured to evaluate one or more assignments of labels to markers.

Spillover

Figure 5A:
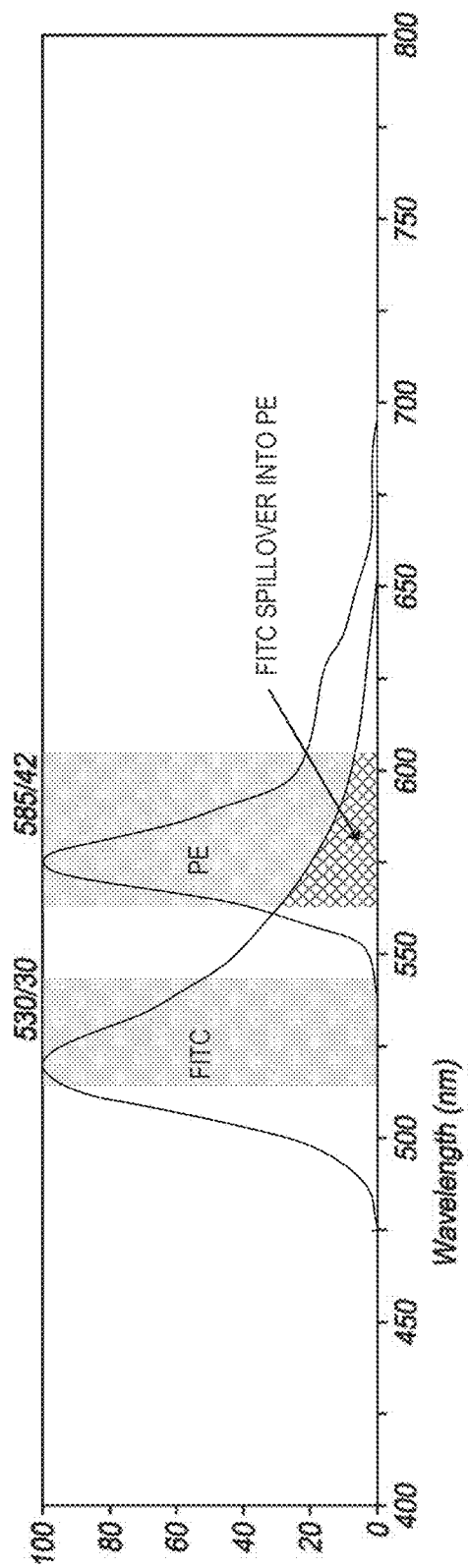
FIG. 5A depicts a graph showing examples of the emission spectra of labels and the filter windows of photodetectors.

FIG. 5A shows an illustrative example of spillover caused by overlapping emissions spectra for different labels. FIG. 5A shows the emission spectra of markers labeled with FITC, represented by the curve extending from a wavelength of approximately 475 nm to 650 nm, and the filter window for a "FITC detector." One or more filters, such as bandpass filter 150b as depicted in FIG. 4, can be placed in front of the detector, limiting the range of wavelengths that can reach the detector, the range of wavelengths constituting a filter window. The filter window for the FITC detector is 530/30, meaning that the filter window extends from 515 nm to 545 nm. The FITC filter window is represented by the shaded rectangle extending from 515 nm to 545 nm. FIG. 5A also shows the emission spectra of markers labeled with PE, represented by the curve extending from approximately 525 nm to approximately 725 nm. One or more filters, such as bandpass filter 450c as depicted in FIG. 4, can be placed in front of the detector. The filter window for the PE detector is 585/42, meaning that the filter window extends from 564 nm to 606 nm. The PE filter window is represented by the shaded rectangle extending from 564 nm to 606 nm. FIG. 5A illustrates that a portion of the emissions spectra for FITC overlaps the filter window for the PE detector, labeled as "FITC spillover into PE." Therefore, some of the fluorescence emission of the FITC label is detected in the PE detector and measured along with the fluorescence emission of the PE label. Spillover can cause inaccurate conclusions to be drawn regarding the abundance of labels present on a particle. This problem can be especially acute for recent uses of flow cytometers as more labels and detectors are utilized, which reduces the separation of fluorescent peaks and filter windows. Given also the increasing number of fluorescent labels available (generally dozens of options are available to an experimenter), with a variety of peak wavelengths, emission intensities and energies, and spectral width characteristics, the variety of marker densities on cells being characterized, as well as in some cases selectable filter windows, it is very challenging to design a suitable set up for a flow cytometer experiment. A further complication is the autofluorescence of cells or other particles being characterized. This autofluorescence signal will also overlap one or more filter windows causing noise in the measurements. The autofluorescence noise signal can further be dependent on the type of particle/cell being interrogated.

To take spillover across multiple detectors for multiple labels into account, spectral overlap values may be characterized for all labels in all detectors through each respective filter window. At each detection event, the response of a given detector is the sum of the products of the overlap of the given detector filter window with each label multiplied respectively by the amount of each label present during the detection event. For a set of m detectors being used to detect n different labels during an experiment, a set of linear equations relating the observed m detector responses at the event with label abundances for each of the n labels at the event can be expressed as d=Ma, where d is an m×1 column vector of output measurements across all m detectors at the event, a is an n×1 column vector of label abundances of each of the n labels used in the experiment, and M is an m row×n column "spillover matrix." The spillover matrix M has entries $S_{ij}$, where $S_{ij}$ corresponds to the response of a detector i (where i runs from 1 to m) to a label j (where j runs from 1 to n). For example, the area of the "FITC spillover into PE" region of FIG. 5 is indicative of a spillover matrix entry where the detector i corresponds to the PE detector and the label j corresponds to the FITC label. When running an experiment, the detector outputs are measured for each event, and label abundances for each event are derived using the formula $a=M^{-1}d$, producing an abundance value for each label at each event based on the measured detector outputs at each event.

In an "ideal" experimental configuration where each detector is sensitive to emission from one and only one label, and no spillover from the emissions of other labels is present, the matrix M is orthogonal, and therefore exactly invertible into the matrix $M^{-1}$. As the one to one correspondence between detector and label is lost due to spillover, the farther from orthogonal the matrix M becomes. As M becomes less orthogonal, the same noise level in the detector measurements produces increasingly larger errors in the derived label abundances. To quantify how close the matrix M is to being orthogonal, the matrix M can be characterized by what is known as a "condition number." The condition number (CN) of a matrix is defined by the equation $CN = (max\ \sigma)/(min\ \sigma)$, wherein CN is the condition number, max $\sigma$ is the maximum singular value of M and min $\sigma$ is the minimum singular value of M. An exactly orthogonal matrix has singular values that are all equal to each other, and therefore has a CN of 1, which is the smallest possible CN value for a matrix. Larger CN for the matrix M correlates to less orthogonality, and generally less accurate experimental results.

Figure 5B:
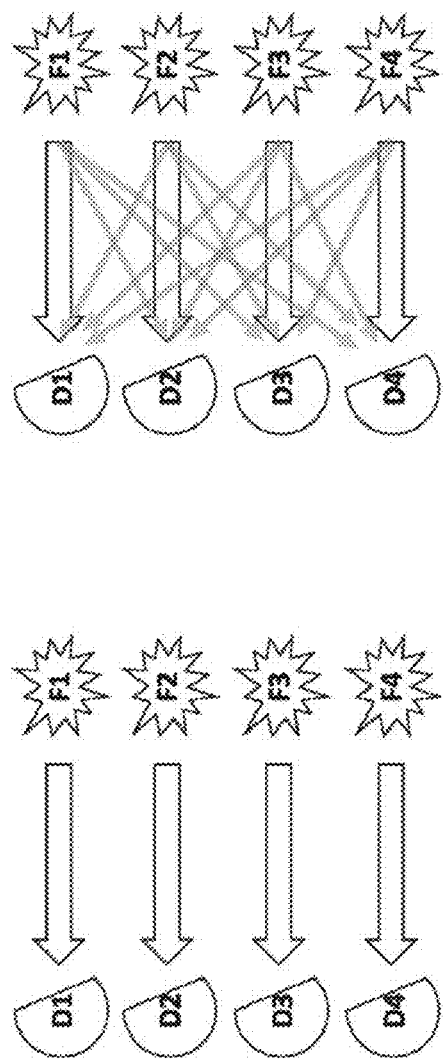
FIG. 5B is a schematic illustration comparing multicolor flow cytometry without and with spillovers.

Spillover. In multicolor flow cytometry multiple detectors (referred to as D1, D2, etc.) detect signals from multiple fluorophores or fluorochromes (referred to as F1, F2, etc.). Signals from different fluorochromes can have different biological meanings. Thus, ideally each detector can be configured to detect the signal from only one fluorochrome, for example, F1 from D1, F2 from D2, etc. In practice, however, a spillover can happen: some signal (e.g., small signal) from F1 is also received by detectors D2, D3, etc.; some signal from F2 is received by D1, D3, etc. FIG. 5B is a schematic illustration comparing multicolor flow cytometry without and with spillovers.

Compensation. After an instrument (e.g. a particle analyzer such as a flow cytometer) records this mixed signals from the detectors, the signal from each fluorochrome out of the mixed signals can be determined by the calculation referred to as compensation. In order to perform this calculation, information about which fraction from each fluorochrome is spilled over into each channel is needed. This information can be presented in a table like Table 1a. The numbers in Table (the fractions) are the spillover coefficients. Diagonal elements are all ones in the example spillover table. This is because the fraction of signal from a fluorochrome to the fluorochrome's dedicated detector is always 1. Sometimes the fractions are expressed as percentages. Table 1b is one such spillover table.

TABLE 1a

Spillover table.

| | F1 | F2 | F3 | F4 |
|---|---|---|---|---|
| D1 | 1 | 0.4 | 0.01 | 0.04 |
| D2 | 0.3 | 1 | 0.02 | 0.05 |
| D3 | 0.2 | 0.5 | 1 | 0.06 |
| D4 | 0.1 | 0.6 | 0.03 | 1 |

TABLE 1b

Spillover table with percentages

| | F1 | F2 | F3 | F4 |
|---|---|---|---|---|
| D1 | 100 | 40 | 1 | 4 |
| D2 | 30 | 100 | 2 | 5 |
| D3 | 20 | 50 | 100 | 6 |
| D4 | 10 | 60 | 3 | 100 |

Spillover Editor

Figure 6:
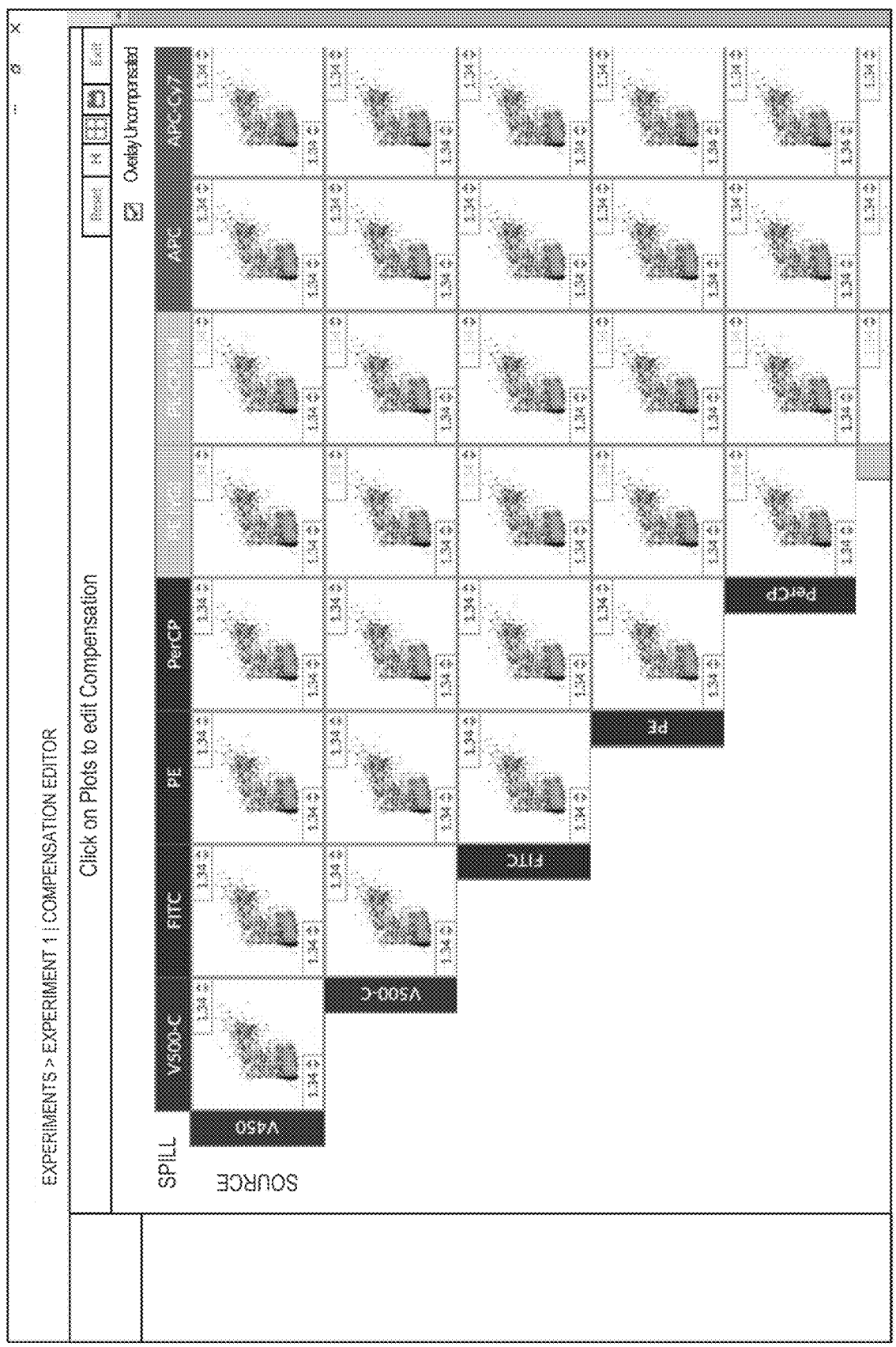
FIG. 6 shows a non-limiting exemplary illustration of spillover editor layout.

Disclosed herein include embodiments of a spillover editor (also referred to as a compensation editor). In some embodiments, the spillover editor can be a triangular matrix or grid with display areas including plots with superimposed spillover values (e.g., spillover values as percentages or fractions) on plots (e.g., bivariate plots of distributions of fluorochromes or fluorophores). FIG. 6 shows a non-limiting exemplary spillover editor layout. Once the spillover editor is launched, a user can adjust values within the matrix, based on the original configuration of a particle analysis experiment (e.g., a flow cytometry experiment) or the spillover values from a default spillover matrix of the experiment. The fluorochromes can be ordered (e.g., descending or ascending order) by wavelengths, horizontally and vertically, and color-coded, for example.

Figure 7:
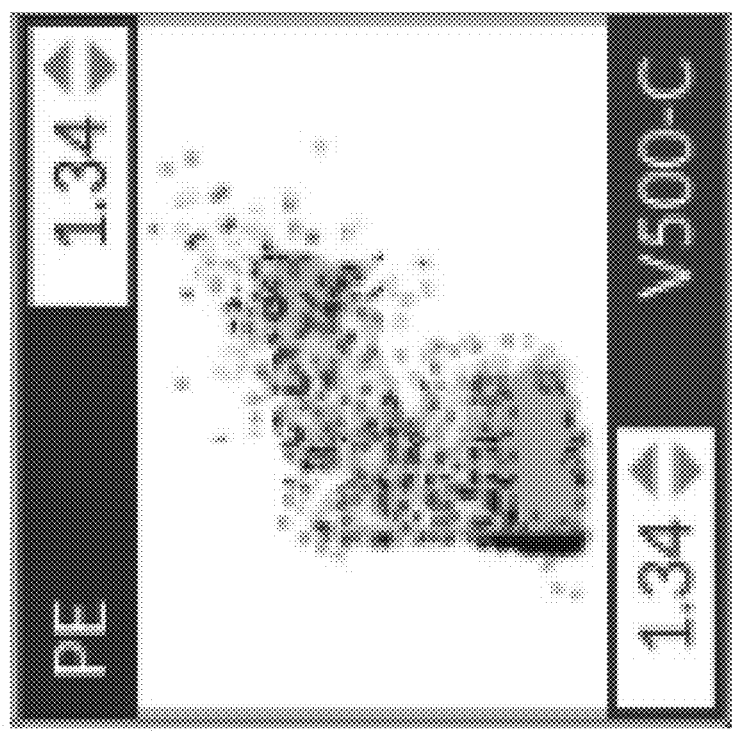
FIG. 7 is a non-limiting exemplary illustration of a plot in a spillover editor layout with labels of fluorochromes and the spillover values.

Each plot (or each display area comprising a plot) can display two spillover values. In some embodiments of the spillover editor disclosed herein, the spillover values relevant (e.g., most relevant) to each plot can be overimposed on this plot. Once the user selects a plot in the grid, the spillover editor can also display the labels for both fluorochromes. In some embodiments, the biological markers associated with (e.g. conjugated with) with the fluorochromes are not shown as parts of the labels for the fluorochromes in the selected plot. (See FIG. 7 for an example). FIG. 7 shows that the labels of the source of the spillover and the target of the spillover being at top left and the bottom right of the plot or display area, respectively. In some embodiments, the labels of the source of the spillover and the target of the spillover can be at the bottom right and top left of the plot or display area, respectively. In some embodiments, the labels of the source of the spillover and the target of the spillover can be at the top right and bottom left of the plot or display area, respectively. In some embodiments, the labels of the source of the spillover and the target of the spillover can be at the bottom left and top right of the plot or display area, respectively.

Figure 8:
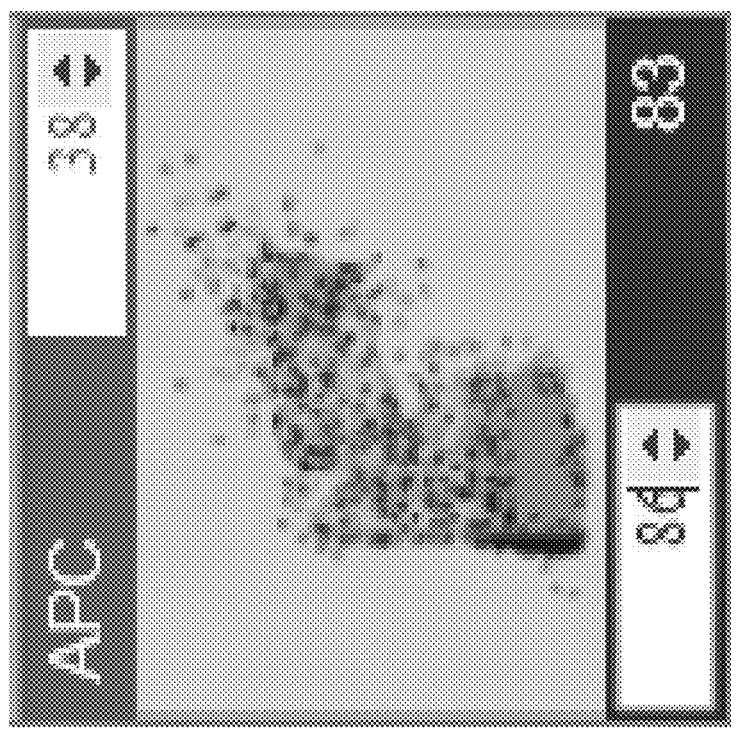
FIG. 8 is another non-limiting exemplary illustration of a plot in a spillover editor layout with one of the two labels of fluorochromes replaced with the original non-edited spillover value.

As the user adjusts the spillover values or numbers, the spillover editor can enable the user to see the original value (e.g., from a default spillover matrix of the experiment) the user started from by replacing the label with the original numeric value (See FIG. 8 for an example). FIG. 8 shows a non-limiting exemplary illustration of a plot in a spillover editor layout with one of the two spillover values being edited and the one of the two labels of fluorochromes replaced with the original non-edited spillover value. As the user adjusts the spillover values, the compensation (generated using the adjusted spillover values) and uncompensated plots can be adjusted or updated across the whole grid. In some embodiments, as the user adjusts the spillover values, the compensated plot generated using the default spillover values and the compensated plot generated using the adjusted spillover values can be adjusted or updated across the whole grid. The user may be able to double click on the original spillover value to replace the current edited value with it. In some embodiments, the spillover editor disclosed herein provides the user the ability to reset the values per plot.

Figure 9:
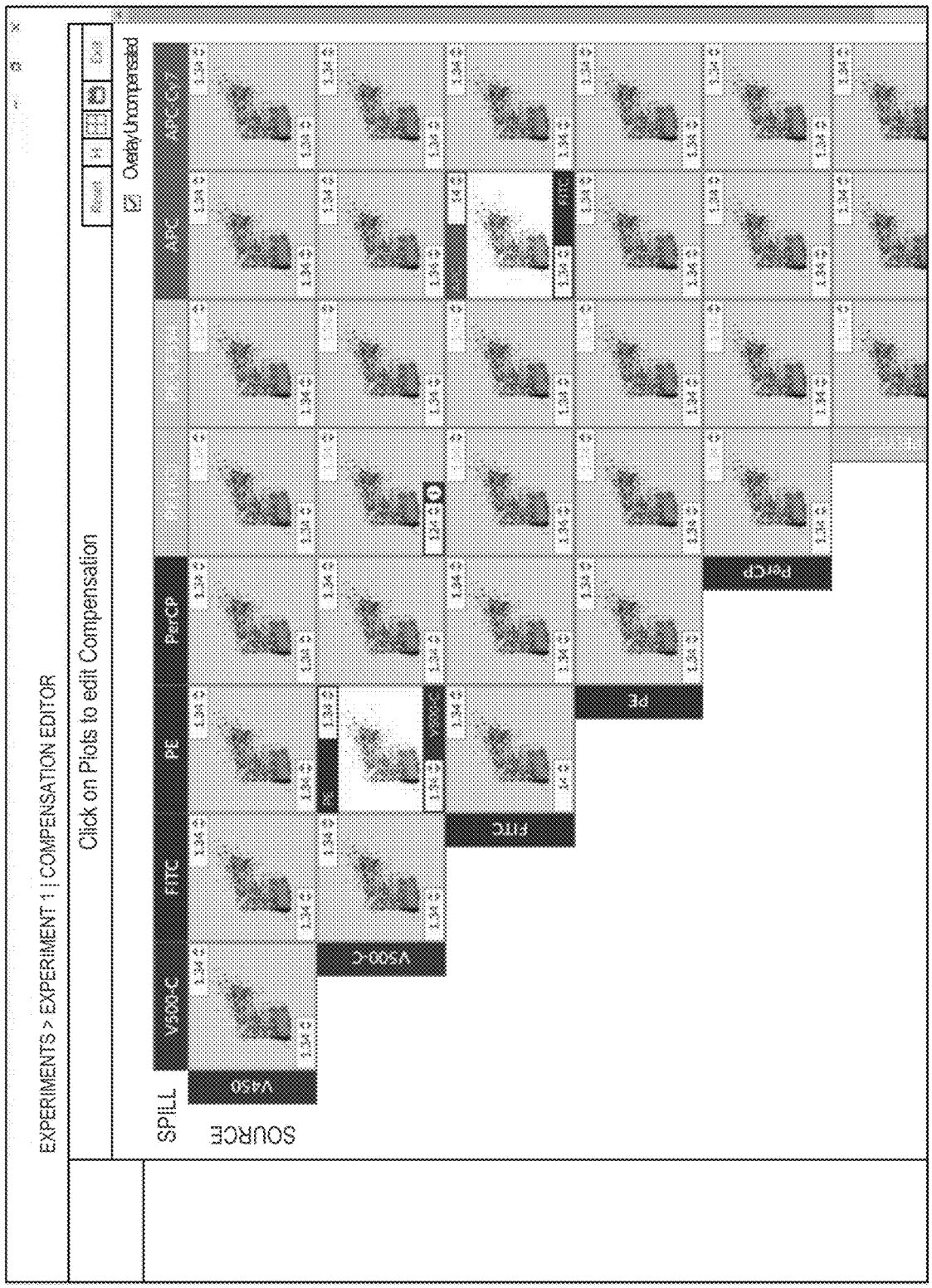
FIG. 9 shows another non-limiting exemplary spillover editor layout with plots having edited or adjusted spillover values and plots without any edited or adjusted spillover as having different background colors (e.g., white and gray).

When the user adjusts a spillover value, the spillover editor can create a visual trail to indicate to the user which plots the user has edited to help assess the work done so far by, for example, changing the background color of a plot with an edited spillover value (See FIG. 9 for an example). FIG. 9 shows another non-limiting exemplary spillover editor layout with plots having edited or adjusted spillover values and plots without any edited or adjusted spillover as having different background colors (e.g., white and shaded).

In some embodiments, the spillover editor disclosed herein provides the user with a visual history of changes made within each plot. In some embodiments, the spillover editor can have a history functionality whereby the user can see a snapshot of all values the user started from and the last snapshot of the latest values (See FIG. 9 for an example).

In some embodiments, users can adjust the spillover numbers superimposed on plots (or close to the plots in the display areas comprising the plots). The spillover editor with the spillover values superimposed on the plots (or close to the plots in the display areas including the plots) can enable the user to see useful information (e.g., the edited or adjusted spillover values and the effects of adjusting the spillover values on the distributions of cells on the plots) simultaneously in a readable and easy-to-use manner. In some embodiments, the spillover values in the display areas are sufficiently large, readable, and/or legible (for example, compared to the spillover values in a spillover table). In some embodiments, the row and column labels of fluorophore names are sufficiently large, readable, and/or legible (e.g., without the names of antibodies shown). In some embodiments, the names of the fluorophores with the spillover values displayed on the plots are shown without the names of the targets of the antibodies associated with (e.g., conjugated with) the fluorophores. With the spillover values superimposed on the plots and edited on the plots, the effects on the plots by adjusting the spillover value are readily observed.

In some embodiments, the spillover editor has a filtering by population hierarchy functionality. The spillover editor can display or render a hierarchy of cell types or gates. The hierarchy can include a root node representing all events for a sample (e.g., all cells of a sample). The root node can include one or more children nodes (e.g., a subset of cells, such as cells of cell types of interest, determined based on the multidimensional fluorescence intensity data of fluorophores conjugated to antibodies bound to the cells in the sample). Some child nodes may be selected or deselected for filtering when generating or updating the triangular matrix of plots.

Figure 10:
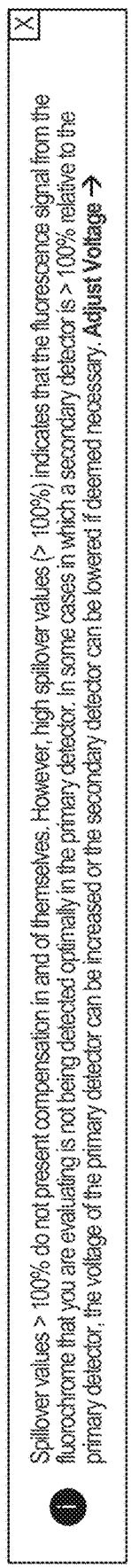
FIG. 10 shows a non-limiting exemplary illustration of a warning message when a spillover value is too big (e.g., if a percentage spillover value is over 100).

In some embodiments, the spillover editor provides a zoom-in functionality where a user can hover over plots and see in more details what has shifted between the compensated and uncompensated data, for example. In some embodiments, the spillover editor can provide the user with a warning icon (See FIG. 9 for an example) that a percentage spillover value is over 100 with the. Once the warning icon is clicked, the spillover editor can display a warning message (See FIG. 10 for an example). With the intuitive spillover editor disclosed herein, a user (e.g., a novice user) can easily adjust spillover values and perform necessary compensation adjustment for a flow cytometry experiment.

Displacing and Editing Spillover Values

Figure 11:
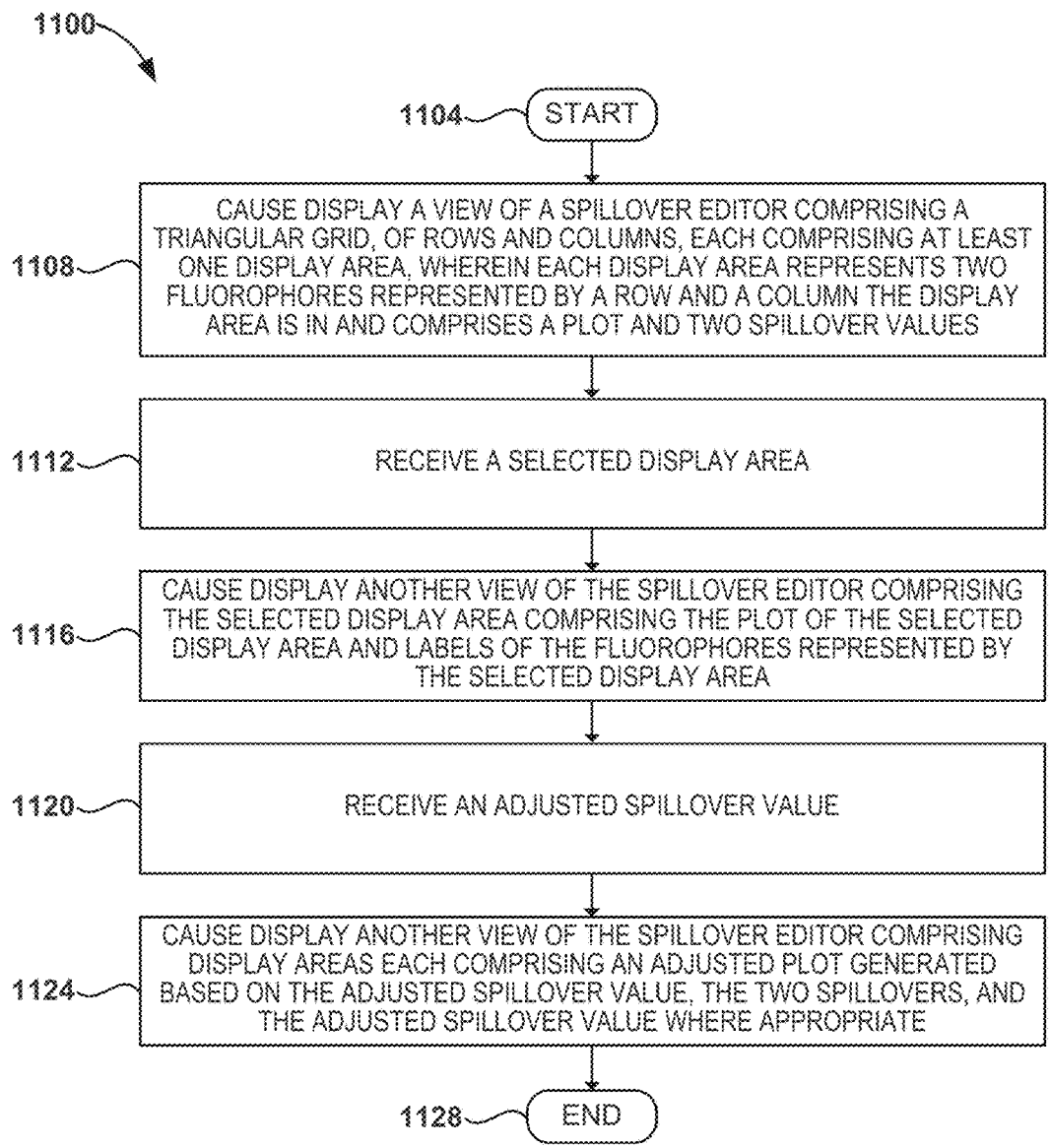
FIG. 11 is a flow diagram showing an exemplary method of displaying and editing spillover values.

FIG. 11 is a flow diagram showing an exemplary method 1100 of displaying and editing spillover values. The method 1100 may be embodied in a set of executable program instructions stored on a computer-readable medium, such as one or more disk drives, of a computing system. For example, the computing system 1200 shown in FIG. 12 and described in greater detail below can execute a set of executable program instructions to implement the method 1100. When the method 1100 is initiated, the executable program instructions can be loaded into memory, such as RAM, and executed by one or more processors of the computing system 1200. Although the method 1100 is described with respect to the computing system 1200 shown in FIG. 12, the description is illustrative only and is not intended to be limiting. In some embodiments, the method 1100 or portions thereof may be performed serially or in parallel by multiple computing systems.

After the method 1100 begins at block 1104, the method 1100 proceeds to block 1108, where a computing system can display, or cause a display to render, a view of a spillover editor comprising a triangular grid of a plurality of rows and a plurality of columns each comprising at least one display area of a first plurality of display areas with a background color of the display area. Each of the plurality of rows and the plurality of columns can represent a fluorophore of a first plurality of fluorophores. Each of the plurality of rows and the plurality of columns can be associated with a header information object of the fluorophore represented by the row and column, respectively. Each of the first plurality of display areas can be in a row of the plurality of rows and a column of the plurality of columns. Each of the first plurality of display areas can represent the two fluorophores of the first plurality of fluorophores represented by the row and the column the display area is in. Each of the first plurality of display areas can comprise (i) a first plot of a plurality of first plots related to the two fluorophores represented by the first plot and (ii) two spillover value information objects, each comprising a spillover value associated with the fluorophores represented by the display area, at a first spillover value information object location and a second spillover value information object location. The numbers of the one or more display areas of two adjacent rows of the plurality of rows and two adjacent columns of the plurality of columns can differ by at least one.

In some embodiments, the numbers of the one or more display areas of any two adjacent rows of the plurality of rows and two adjacent columns of the plurality of columns differ by at least one. The numbers of the one or more display areas of any two adjacent rows of the plurality of rows and two adjacent columns of the plurality of columns can differ by one.

In some embodiments, the header information object of each row is to the left of the leftmost display area of the at least one display area of the row. The header information object of each column can be on the top of the topmost display area of the at least one display area of the column. In some embodiments, the header information object and/or at least one of the label information objects of the fluorophore each comprises a text label of the fluorophore. The header information object and/or at least one of the label information objects of the fluorophore can have a background color related to an emission spectrum of the fluorophore. The background color of the header information object and/or at least one of the label information objects of the fluorophore can be the color of the wavelength with the highest emission in the emission spectrum of the fluorophore. The background color of the header information object and/or at least one of the label information objects can be approximately the color of the wavelength with the highest emission in the emission spectrum of the fluorophore. The emission spectra of two fluorophores of the plurality of fluorophores can be different and/or the wavelengths with the highest emissions in the emission spectra of the two fluorophores are different, and the header information objects and/or the label information objects of the two fluorophores can have an identical background color. A color of the text label of the fluorophore of the background information object and/or at least one of the label information objects and the background color of the background information object and/or the at least one of the label information objects can have a high contrast. The color of the text label can be a white color.

In some embodiments, the rightmost display area of the at least one display area of each of the plurality of rows align with one another. The topmost display area of the at least one display area of each of the plurality of columns can align with one another.

In some embodiments, the first plot can comprise a bivariate plot related to the fluorophores represented by the first plot. The bivariate plot can comprise a distribution of multi-dimensional event data related to the fluorophores represented by the bivariate plot and associated with a plurality of cells. The bivariate plot can comprise a distribution of multi-dimensional event data related to the fluorophores represented by the bivariate plot and associated with one or more cells of interest of a plurality of cells.

In some embodiments, the two fluorophores represented by each display area of the plurality of display areas can be different. The fluorophore represented by a column of the plurality of columns can have an emission spectrum with a wavelength having the highest emission that is greater than a wavelength having the highest emission of an emission spectrum of a fluorophore represented by a subsequent column of the plurality of columns.

In some embodiments, a color of a spillover value of at least one of the spillover value information objects of a display area is associated with the emission spectrum of one of the fluorophores represented by the display area. The color of the spillover value of at least one of the spillover value information objects can be the color of the wavelength with the highest emission in the emission spectrum of the one of the fluorophores represented by the display area. The color of the spillover value of at least one of the spillover value information objects can be approximately the color of the wavelength with the highest emission in the emission spectrum of the one of the fluorophores represented by the display area. A background color of the at least one of the spillover value information objects and the color of the spillover value of at least one of the spillover value information object can have a high contrast. A background color of the at least one of the spillover value information objects can be a white color.

In some embodiments, the first spillover value information object location is adjacent to the first label information object location, and wherein the second spillover value information object location is adjacent to the second label information object location. The first spillover value information object location can be horizontally adjacent to the first label information object location, and wherein the second spillover value information object location can be horizontally adjacent to the second label information object location. The first spillover value information object location can be to the left to the first label information object location, and/or wherein the second spillover value information object location can be to the right of the second label information object location. The first spillover value information object location can be to the right to the first label information object location, and/or wherein the second spillover value information object location is to the left of the second label information object location. The first spillover value information object location can be adjacent to the second label information object location, and wherein the second spillover value information object location is adjacent to the first label information object location.

In some embodiments, the first spillover value information object location and the second spillover value information object location can be at opposite corners of the first plot and/or the second plot. The first spillover value information object location and the second spillover value information object location can be at a top right corner and a bottom left corner of the first display area. The spillover value of the first spillover value information object in the first display area can be a spillover value associated with the emission of a first fluorophore of the two fluorophores represented by the first display area into the detected emission of a second fluorophore of the two fluorophores. The spillover value of the second spillover value information object in the first display area can be a spillover value associated with the emission of the second fluorophore of the two fluorophores represented by the first display area into the detected emission of the first fluorophore of the two fluorophores. The first fluorophore can be represented by the column where the display area is, and the second fluorophore can be represented by the row where the display area is.

In some embodiments, the computing system can: obtain a spillover matrix comprising the spillover values; and generate the view of the spillover editor using the spillover matrix and/or an inverse matrix of the spillover matrix. The spillover matrix can be a default unadjusted spillover matrix. The spillover matrix can be a first adjusted spillover matrix.

In some embodiments, the computing system can: receive a selection of the first plurality of fluorophores from a second plurality of fluorophores comprising the first plurality of fluorophores. The computing system can receive a selection of a second plurality of fluorophores from the first plurality of fluorophores comprising the second plurality of fluorophores. Each of the plurality of rows and the plurality of columns can represent a fluorophores of the second plurality of fluorophores, and each of the first plurality of display areas can represent the two fluorophores of the second plurality of fluorophores represented by the row and the column the display area is in. The computing system can cause the display to render a second adjusted view of the spillover editor comprising a second plurality of display areas each comprising (i) the second plot related to the corresponding first plot, generated based on the adjusted spillover value, that represents two fluorophores of the second plurality of fluorophores and (ii) the two spillover information objects of the display area at the first spillover value information object location and the second spillover value information object location. The computing system can generate the second adjusted view of the spillover editor.

The method 1100 proceeds from block 1108 to block 1112, where the computing system can receive a selection event of a selected display area of the first plurality of display areas in a selected row of the plurality of rows and a selected column of the plurality of columns.

After receiving the selection event at block 1112, the method 1100 proceeds to block 1116, where the computing system can display, or cause the display to render, a selected view of the spillover editor comprising the selected display area comprising (i) the first plot of the selected display area and (ii) label information objects of the fluorophores represented by the selected display area at a first label information object location and a second label information object location of the selected display area.

The method 1100 proceeds from block 1116 to block 1120, where the computing system can receive an adjusted spillover value of a first spillover value information object of the two spillover value information objects of the selected display area. In some embodiments, the spillover value information objects of each of the first plurality of display areas and/or the selected display area each comprises an increase indicator and a decrease indicator. The increase indicator can comprise an up arrow, and wherein the decrease indicator comprises a down arrow. To receive the adjusted spillover value, the computing system can receive an activation event of the increase indicator or the decrease activator. To receive the adjusted spillover value, the computing system can receive a text input of the adjusted spillover value from a user.

In some embodiments, the computing system can: receive a spillover value reset event of the adjusted spillover value; and cause the display to render the view of the spillover editor. The spillover value reset event can comprise a click or a double click of the spillover value of the first spillover value information object at the first label information object location using a pointer device. In some embodiments, the spillover editor disclosed herein provides the ability to reset the values per plot.

In some embodiments, the computing system can: determine the updated spillover value is above a threshold value; and display a warning information object at a warning information object location adjacent to the first spillover value information object location. The threshold value can be 100%.

After receiving the adjusted spillover value at block 1120, the method 1100 proceeds to block 1124, where the computing system can cause the display to render a first adjusted view of the spillover editor comprising the first plurality of display areas each comprising (i) a second plot related to the corresponding first plot generated based on the adjusted spillover value and (ii) the two spillover information objects of the display area at the first spillover value information object location and the second spillover value information object location. The selected display area has an adjusted background color of the display area and can comprise (i) the adjusted spillover value of the first spillover value information object at the first spillover value information object location and (ii) the spillover value of the first spillover value information object at the first label information object location.

In some embodiments, each of the first plurality of display areas in the first adjusted view of the spillover editor comprises the first plot and the second plot of the display area superimposed. In some embodiments, the computing system can determine a selection event to superimpose the first plot and the second plot.

The computing system can: determine a second adjusted spillover matrix comprising the adjusted spillover value from the spillover matrix: and generate the first adjusted view of the spillover editor using the second adjusted spillover matrix. The computing system can: determine an inverse matrix of the second adjusted spillover matrix, wherein generating the first adjusted view of the spillover editor comprises generating the first adjusted view of the spillover editor using the inverse matrix of the second adjusted spillover matrix.

In some embodiments, the second plot can comprise a bivariate plot related to the fluorophores represented by the first plot. The bivariate plot can comprise a distribution of multi-dimensional event data related to the fluorophores represented by the bivariate plot and associated with a plurality of cells. The bivariate plot can comprise a distribution of multi-dimensional event data related to the fluorophores represented by the bivariate plot and associated with one or more cells of interest of a plurality of cells.

The computing system can: cause the display to render a population hierarchy of a plurality of cell types of the plurality of cells determined using the multi-dimensional event data; and receive a selection event of one or more of the plurality of cells types, wherein the one or more cells of interest comprise one or more cells of the plurality of cells having any of the one or more of the plurality of cell types. The h computing system can receive multi-dimensional event data related to the first plurality of fluorophores and associated with a plurality of cells.

In some embodiments, the computing system can: receive an enlarging event of a display area of the first plurality of display areas; and cause the display to render the spillover editor comprising an enlarged display area corresponding to the display area of the enlarging event. The enlarging event of the display area can comprise a pointer device hovering over the display area of the enlarging event.

In some embodiments, the computing system can generate the view of the spill editor, the selected view of the spillover editor, and/or the first adjusted view of the spillover editor. In some embodiments, the hardware processor is programmed by the executable instructions to display the view of the spill editor, the selected view of the spillover editor, and/or the first adjusted view of the spillover editor. The method 1100 ends at block 1128.

Execution Environment

Figure 12:
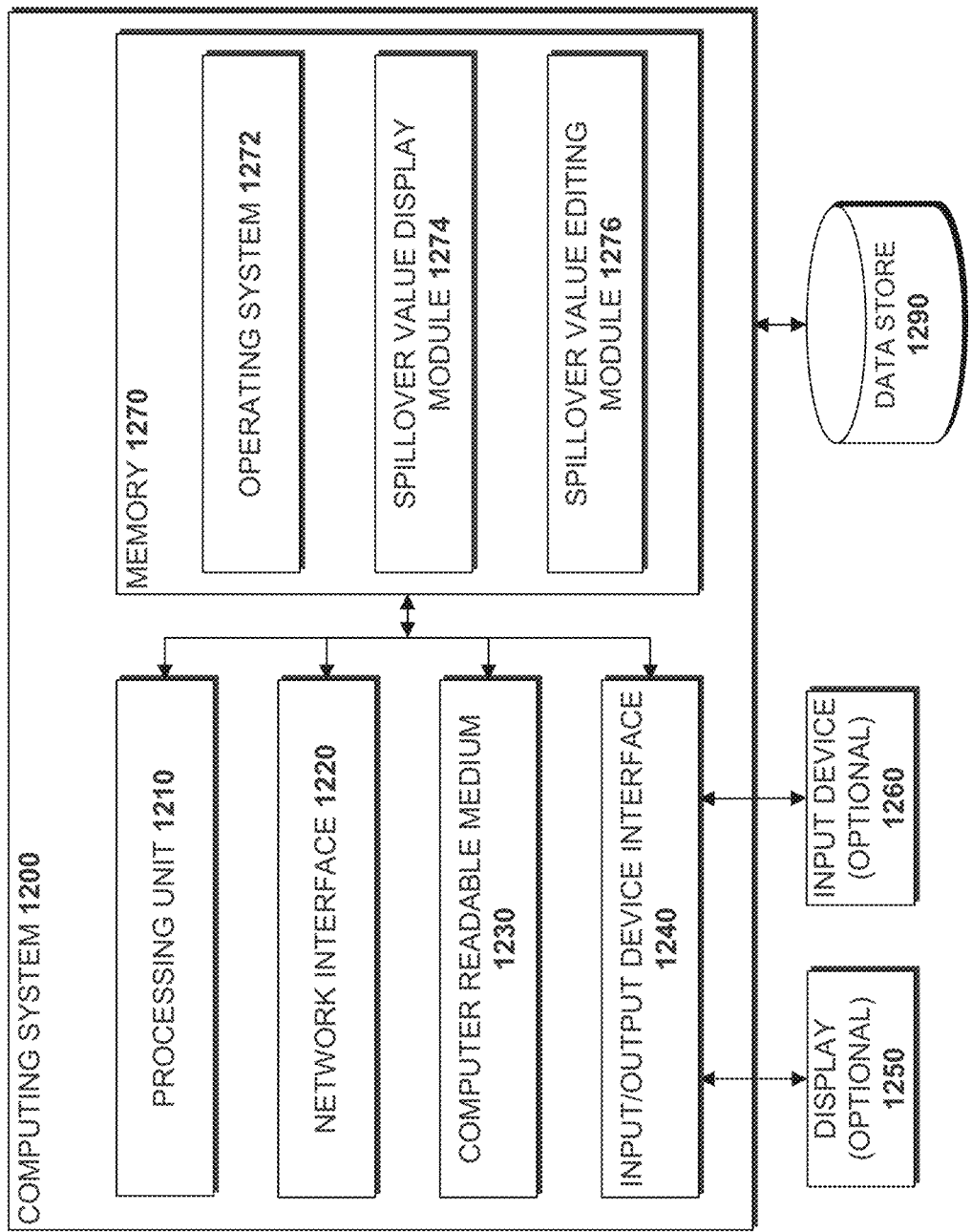
FIG. 12 is a block diagram of an illustrative computing system configured to implement a spillover editor.

In FIG. 12 depicts a general architecture of an example computing device 1200 configured to implement the metabolite, annotation and gene integration system disclosed herein. The general architecture of the computing device 1200 depicted in FIG. 12 includes an arrangement of computer hardware and software components. The computing device 1200 may include many more (or fewer) elements than those shown in FIG. 12. It is not necessary, however, that all of these generally conventional elements be shown in order to provide an enabling disclosure. As illustrated, the computing device 1200 includes a processing unit 1210, a network interface 1220, a computer readable medium drive 1230, an input/output device interface 1240, a display 1250, and an input device 1260, all of which may communicate with one another by way of a communication bus. The network interface 1220 may provide connectivity to one or more networks or computing systems. The processing unit 1210 may thus receive information and instructions from other computing systems or services via a network. The processing unit 1210 may also communicate to and from memory 1270 and further provide output information for an optional display 1250 via the input/output device interface 1240. The input/output device interface 1240 may also accept input from the optional input device 1260, such as a keyboard, mouse, digital pen, microphone, touch screen, gesture recognition system, voice recognition system, gamepad, accelerometer, gyroscope, or other input device.

The memory 1270 may contain computer program instructions (grouped as modules or components in some embodiments) that the processing unit 1210 executes in order to implement one or more embodiments. The memory 1270 generally includes RAM, ROM and/or other persistent, auxiliary or non-transitory computer-readable media. The memory 1270 may store an operating system 1272 that provides computer program instructions for use by the processing unit 1210 in the general administration and operation of the computing device 1200. The memory 1270 may further include computer program instructions and other information for implementing aspects of the present disclosure.

For example, in one embodiment, the memory 1270 includes a spillover value display module 1274 for generating views of a spillover editor and a spillover value editing module 1276 for editing spillover values (e.g., for receiving adjusted spillover values) shown in a spillover editor superimposed on plots of cell distributions, such as the method 1100 for displaying and editing spillover values described with reference to FIG. 11. In addition, memory 1270 may include or communicate with the data store 1290 and/or one or more other data stores that store multidimensional fluorescence intensity data, spillover values, spillover matrices comprising the spillover values, adjusted spillover values, and/or adjusted spillover matrices comprising the adjusted spillover values.

Terminology

As used herein, the terms "determine" or "determining" encompass a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

As used herein, the terms "provide" or "providing" encompass a wide variety of actions. For example, "providing" may include storing a value in a location of a storage device for subsequent retrieval, transmitting a value directly to the recipient via at least one wired or wireless communication medium, transmitting or storing a reference to a value, and the like. "Providing" may also include encoding, decoding, encrypting, decrypting, validating, verifying, and the like via a hardware element.

As used herein, the term "selectively" or "selective" may encompass a wide variety of actions. For example, a "selective" process may include determining one option from multiple options. A "selective" process may include one or more of: dynamically determined inputs, preconfigured inputs, or user-initiated inputs for making the determination. In some implementations, an n-input switch may be included to provide selective functionality where n is the number of inputs used to make the selection.

As used herein, the term "message" encompasses a wide variety of formats for communicating (e.g., transmitting or receiving) information. A message may include a machine readable aggregation of information such as an XML document, fixed field message, comma separated message, or the like. A message may, in some implementations, include a signal utilized to transmit one or more representations of the information. While recited in the singular, it will be understood that a message may be composed, transmitted, stored, received, etc. in multiple parts.

As used herein a "user interface" (also referred to as an interactive user interface, a graphical user interface or a UI) may refer to a network based interface including data fields, buttons, or other interactive controls for receiving input signals or providing electronic information or for providing information to the user in response to any received input signals. A UI may be implemented in whole or in part using technologies such as hyper-text mark-up language (HTML), JAVASCRIPT™, FLASH™, JAVA™, .NET™, WINDOWS OS™, macOS™, web services, or rich site summary (RSS). In some implementations, a UI may be included in a stand-alone client (for example, thick client, fat client) configured to communicate (e.g., send or receive data) in accordance with one or more of the aspects described.

As used herein a "data store" may be embodied in hard disk drives, solid state memories and/or any other type of non-transitory computer-readable storage medium accessible to or by a device such as an access device, server, or other computing device described. A data store may also or alternatively be distributed or partitioned across multiple local and/or remote storage devices as is known in the art without departing from the scope of the present disclosure. In yet other embodiments, a data store may include or be embodied in a data storage web service.

Those of skill in the art would understand that information, messages, and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may be implemented in hardware, software, firmware, or any combination thereof. Such techniques may be implemented in any of a variety of devices such as specifically programmed event processing computers, wireless communication devices, or integrated circuit devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM). FLASH memory, magnetic or optical data storage media, and the like. The computer-readable medium may be a non-transitory storage medium. The techniques additionally, or alternatively, may be realized at least in part by a computer-readable communication medium that carries or communicates program code in the form of instructions or data structures and that can be accessed, read, and/or executed by a computing device, such as propagated signals or waves.

The program code may be executed by a specifically programmed sort strategy processor, which may include one or more processors, such as one or more digital signal processors (DSPs), configurable microprocessors, an application specific integrated circuits (ASICs), field programmable gate arrays (FPGAs), or other equivalent integrated or discrete logic circuitry. Such a graphics processor may be specially configured to perform any of the techniques described in this disclosure. A combination of computing devices, e.g., a combination of a DSP and a microprocessor, a plurality of microprocessors, one or more microprocessors in conjunction with a DSP core, or any other such configuration in at least partial data connectivity may implement one or more of the features describe. In some aspects, the functionality described herein may be provided within dedicated software modules or hardware modules configured for encoding and decoding, or incorporated in a specialized sorting control card.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone. A and B together. A and C together. B and C together, and/or A. B. and C together, etc.). In those instances where a convention analogous to "at least one of A, B, or C, etc." is used, in general such a construction is intended in the sense one having skill in the art would understand the convention (e.g., "a system having at least one of A. B. or C" would include but not be limited to systems that have A alone. B alone, C alone, A and B together. A and C together. B and C together, and/or A. B. and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least." "greater than." "less than," and the like include the number recited and refer to ranges which can be subsequently broken down into sub-ranges as discussed above. Finally, as will be understood by one skilled in the art, a range includes each individual member. Thus, for example, a group having 1-3 articles refers to groups having 1, 2, or 3 articles. Similarly, a group having 1-5 articles refers to groups having 1, 2, 3, 4, or 5 articles, and so forth.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A computing system for displaying and editing spillover values comprising:

non-transitory memory configured to store executable instructions;

a display; and a processor in communication with the non-transitory memory and the display, the processor programmed by the executable instructions to:

cause the display to render a view of a spillover editor comprising a triangular grid of a plurality of rows and a plurality of columns each comprising at least one display area of a first plurality of display areas with a background color of the display area, wherein each of the plurality of rows and the plurality of columns represents a fluorophore of a first plurality of fluorophores, wherein each of the plurality of rows and the plurality of columns is associated with a header information object of the fluorophore represented by the row and column, respectively, wherein each of the first plurality of display areas is in a row of the plurality of rows and a column of the plurality of columns, wherein each of the first plurality of display areas represents the two fluorophores of the first plurality of fluorophores represented by the row and the column the display area is in, wherein each of the first plurality of display areas comprises (i) a first plot of a plurality of first plots related to the two fluorophores represented by the first plot and (ii) two spillover value information objects, each comprising a spillover value associated with the fluorophores represented by the display area, at a first spillover value information object location and a second spillover value information object location, and wherein the numbers of the one or more display areas of two adjacent rows of the plurality of rows and two adjacent columns of the plurality of columns differ by at least one;

receive a selection event of a selected display area of the first plurality of display areas in a selected row of the plurality of rows and a selected column of the plurality of columns;

cause the display to render a selected view of the spillover editor comprising the selected display area comprising (i) the first plot of the selected display area and (ii) label information objects of the fluorophores represented by the selected display area at a first label information object location and a second label information object location of the selected display area;

receive an adjusted spillover value of a first spillover value information object of two spillover value information objects of the selected display area; and cause the display to render a first adjusted view of the spillover editor comprising the first plurality of display areas each comprising (i) a second plot related to the corresponding first plot generated based on the adjusted spillover value and (ii) the two spillover information objects of the display area at the first spillover value information object location and the second spillover value information object location, wherein the selected display area has an adjusted background color of the display area and comprises (i) the adjusted spillover value of the first spillover value information object at the first spillover value information object location and (ii) the spillover value of the first spillover value information Object at the first label information object location.

2. The computing system of claim 1, wherein each of the first plurality of display areas in the first adjusted view of the spillover editor comprises the first plot and the second plot of the display area superimposed.

3. The computing system of claim 2, wherein the hardware processor is programmed by the executable instructions to determine a selection event to superimpose the first plot and the second plot.

4. The computing system of claim 1, wherein the hardware processor is programmed by the executable instructions to:

obtain a spillover matrix comprising the spillover values; and generate the view of the spillover editor using the spillover matrix and/or an inverse matrix of the spillover matrix.

5. The computing system of claim 4, wherein the spillover matrix is a default unadjusted spillover matrix.

6. The computing system of claim 4, wherein the spillover matrix is a first adjusted spillover matrix.

7. The computing system of claim 1, wherein the hardware processor is programmed by the executable instructions to:

determine a second adjusted spillover matrix comprising the adjusted spillover value from the spillover matrix; and generate the first adjusted view of the spillover editor using the second adjusted spillover matrix.

8. The computing system of claim 7, wherein the hardware processor is programmed by the executable instructions to:

determine an inverse matrix of the second adjusted spillover matrix, wherein generating the first adjusted view of the spillover editor comprises generating the first adjusted view of the spillover editor using the inverse matrix of the second adjusted spillover matrix.

9. The computing system of claim 1, wherein the first plot comprises an uncompensated plot, and wherein the second plot comprises a compensated plot generated using the adjusted spillover value.

10. The computing system of claim 1, wherein the first plot comprises a compensated plot generated using the spillover value corresponding to the adjusted spillover value, and wherein the second plot comprises a compensated plot generated using the adjusted spillover value.

11. The computing system of claim 1, wherein the first plot and/or the second plot comprises a bivariate plot related to the fluorophores represented by the first plot.

12. The computing system of claim 11, wherein the bivariate plot comprises a distribution of multi-dimensional event data related to the fluorophores represented by the bivariate plot and associated with a plurality of cells.

13. The computing system of claim 11, wherein the bivariate plot comprises a distribution of multi-dimensional event data related to the fluorophores represented by the bivariate plot and associated with one or more cells of interest of a plurality of cells.

14. The computing system of claim 13, wherein the hardware processor is programmed by the executable instructions to:

cause the display to render a population hierarchy of a plurality of cell types of the plurality of cells determined using the multi-dimensional event data; and receive a selection event of one or more of the plurality of cells types, wherein the one or more cells of interest comprise one or more cells of the plurality of cells having any of the one or more of the plurality of cell types.

15. The computing system of claim 1, wherein the hardware processor is programmed by the executable instructions to receive multi-dimensional event data related to the first plurality of fluorophores and associated with a plurality of cells.

16. The computing system of claim 1, wherein the two fluorophores represented by each display area of the plurality of display areas are different.

17. The computing system of claim 1, wherein the fluorophore represented by a column of the plurality of columns has an emission spectrum with a wavelength having the highest emission that is greater than a wavelength having the highest emission of an emission spectrum of a fluorophore represented by a subsequent column of the plurality of columns.

18. A computing system for displaying and editing spillover values comprising:

non-transitory memory configured to store executable instructions;

a display; and a processor in communication with the non-transitory memory and the display, the processor programmed by the executable instructions to:

cause the display to render a view of a spillover editor comprising a triangular grid of a plurality of rows and a plurality of columns each comprising at least one display area of a first plurality of display areas with a background color of the display area, wherein each of the plurality of rows and the plurality of columns represents a fluorophore of a first plurality of fluorophores, wherein each of the plurality of rows and the plurality of columns is associated with a header information object of the fluorophore represented by the row and column, respectively, and wherein each of the first plurality of display areas is in a row of the plurality of rows and a column of the plurality of columns, wherein each of the first plurality of display areas represents the two fluorophores of the first plurality of fluorophores represented by the row and the column the display area is in, wherein each of the first plurality of display areas comprises (i) a first plot of a plurality of first plots and (ii) two spillover value information objects, comprising two spillover values associated with the fluorophores represented by the display area, at a first spillover value information object location and a second spillover value information object location;

receive an adjusted spillover value of a first spillover value information object of the two spillover value information objects of a selected display area of the first plurality of display areas in a selected row of the plurality of rows and a selected column of the plurality of columns; and cause the display to render a first adjusted view the spillover editor comprising the first plurality of display areas each comprising (i) a second plot related to the corresponding first plot generated based on the adjusted spillover value and (ii) the two spillover information objects of the display area at the first spillover value information object location and the second spillover value information object location, wherein the selected display area has an adjusted background color of the display area and comprises (i) the adjusted spillover value of the first spillover value information object at the first spillover value information object location and (ii) the spillover value of the first spillover value information object at the first label information object location.

19. The computing system of claim 18, wherein the numbers of the one or more display areas of two adjacent rows of the plurality of rows and two adjacent columns of the plurality of columns differ by at least one.

20. The computing system of claim 18, wherein the hardware processor is programmed by the executable instructions to:

receive a selection event of the selected display area of the first plurality of display areas in the selected row of the plurality of rows and the selected column of the plurality of columns; and cause the display to render a selected view of the spillover editor comprising the selected display area comprising (i) the first plot of the selected display area and (ii) label information objects of the fluorophores represented by the selected display area at a first label information object location and a second label information object location of the selected display area.

* * * * *